(12) United States Patent
Cho et al.

(10) Patent No.: US 11,536,477 B2
(45) Date of Patent: Dec. 27, 2022

(54) ELECTRONIC APPARATUS AND OPERATION METHOD FOR PREDICTING HVAC ENERGY CONSUMPTION

(71) Applicant: Samsung Electronics Co., Ltd., Suwon-si (KR)

(72) Inventors: Hyeonje Cho, Suwon-si (KR); Inhwan Hwang, Suwon-si (KR); Huijung Kim, Suwon-si (KR); Yunhu Ji, Suwon-si (KR); Sehoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/004,445

(22) Filed: Aug. 27, 2020

(65) Prior Publication Data

US 2021/0088245 A1 Mar. 25, 2021

(30) Foreign Application Priority Data

Sep. 19, 2019 (KR) .......................... 10-2019-0115472

(51) Int. Cl.
*F24F 11/46* (2018.01)
*F24F 11/63* (2018.01)
(Continued)

(52) U.S. Cl.
CPC .............. *F24F 11/46* (2018.01); *F24F 11/52* (2018.01); *F24F 11/63* (2018.01);
(Continued)

(58) Field of Classification Search
CPC .. F24F 11/46; F24F 11/52; F24F 11/63; F24F 2110/12; F24F 2130/10; F24F 2110/32;
(Continued)

(56) References Cited

U.S. PATENT DOCUMENTS 8,396,601 B2  3/2013  Tomita et al.
10,001,289 B2  6/2018  Mowris
(Continued)

FOREIGN PATENT DOCUMENTS

JP  08-322147 A  12/1996
JP  2012-211738 A  11/2012
(Continued)

OTHER PUBLICATIONS

International Search Report, dated Dec. 2, 2020, issued in International Patent Application No. PCT/KR2020/011493.
(Continued)

*Primary Examiner* — Darrin D Dunn
(74) *Attorney, Agent, or Firm* — Jefferson IP Law, LLP

(57) ABSTRACT

An operation method for reducing energy consumption and an electronic apparatus thereof are provided. The operation method includes obtaining, by the electronic apparatus, weather forecast information, inputting, by the electronic apparatus, the weather forecast information to an artificial intelligence model for predicting an amount of power to be consumed by a first air conditioner, and displaying, by the electronic apparatus, the predicted power consumption amount of the first air conditioner output from the artificial intelligence model, wherein the artificial intelligence model is trained to obtain correlation information between a weather condition and a power consumption amount of an air conditioner, based on a weather history and operations of a plurality of air conditioners related to the weather history, and predict the amount of power to be consumed by the first air conditioner based on the correlation information and the weather forecast information.

18 Claims, 17 Drawing Sheets

(51) Int. Cl.
*F24F 11/52* (2018.01)
*F24F 110/12* (2018.01)
*F24F 130/10* (2018.01)
*F24F 110/32* (2018.01)
*F24F 110/52* (2018.01)
*F24F 110/74* (2018.01)
*F24F 110/22* (2018.01)

(52) U.S. Cl.
CPC ....... *F24F 2110/12* (2018.01); *F24F 2110/22* (2018.01); *F24F 2110/32* (2018.01); *F24F 2110/52* (2018.01); *F24F 2110/74* (2018.01); *F24F 2130/10* (2018.01)

(58) Field of Classification Search
CPC .............. F24F 2110/52; F24F 2110/74; F24F 2110/22; F24F 11/65; G01W 1/10; G06N 3/08; G06N 20/00; G06Q 50/06; Y04S 20/244; Y04S 10/50
See application file for complete search history.

(56) References Cited

U.S. PATENT DOCUMENTS

| | | | |
|---|---|---|---|
| 11,397,020 B2 | 7/2022 | Moon et al. | |
| 2006/0031180 A1* | 2/2006 | Tamarkin | H04M 11/002 705/412 |
| 2009/0187445 A1 | 7/2009 | Barclay et al. | |
| 2011/0313578 A1 | 12/2011 | Jones et al. | |
| 2015/0248118 A1* | 9/2015 | Li | F24F 11/30 700/295 |
| 2016/0291622 A1 | 10/2016 | Al-Mohssen et al. | |
| 2016/0305678 A1* | 10/2016 | Pavlovski | G05B 15/02 |
| 2017/0124466 A1* | 5/2017 | Li | G06Q 50/06 |
| 2017/0206615 A1 | 7/2017 | Sloop et al. | |
| 2017/0211830 A1* | 7/2017 | Kosaka | G05B 19/048 |
| 2018/0195752 A1 | 7/2018 | Sasaki et al. | |
| 2019/0224928 A1* | 7/2019 | Danninger | B29C 70/386 |
| 2019/0271483 A1 | 9/2019 | Joo et al. | |
| 2020/0124308 A1* | 4/2020 | Ota | F24F 11/47 |
| 2020/0355387 A1* | 11/2020 | Samuni | G06N 20/00 |
| 2021/0116874 A1* | 4/2021 | Murugesan | G01D 4/004 |
| 2021/0215370 A1* | 7/2021 | Moon | G06N 3/08 |

FOREIGN PATENT DOCUMENTS

| | | |
|---|---|---|
| JP | 2018-091560 A | 6/2018 |
| JP | 6372684 B2 | 8/2018 |
| JP | 2019-007632 A | 1/2019 |
| KR | 10-2016-0150156 A | 12/2016 |
| KR | 10-2018-0065601 A | 6/2018 |
| KR | 10-2019-0096878 A | 8/2019 |
| WO | 2017/062896 A1 | 4/2017 |

OTHER PUBLICATIONS

Household Electricity Demand Forecasting-Benchmarking State-of-the-Art Methods; Apr. 1, 2014.
Electricity forecasting on the individual household level enhanced based on activity patterns; Apr. 19, 2017.
Nonintrusive Appliance Load Monitoring—Review and Outlook; Feb. 21, 2011.
Dentifying trends in the use of domestic appliances from household; Dec. 2008.
European Search Report dated May 24, 2022; European Appln No. 20864481.5-1016/3966775 PCT/KR2020011493.

* cited by examiner

ELECTRONIC APPARATUS AND OPERATION METHOD FOR PREDICTING HVAC ENERGY CONSUMPTION

CROSS-REFERENCE TO RELATED APPLICATION(S)

This application is based on and claims priority under 35 U.S.C. § 119 of a Korean patent application number 10-2019-0115472, filed on Sep. 19, 2019, in the Korean Intellectual Property Office, the disclosure of which is incorporated by reference herein in its entirety.

BACKGROUND

1. Field

The disclosure relates to an electronic apparatus and an operation method of the electronic apparatus.

2. Description of Related Art

Regarding energy consumption, which has become a worldwide issue, countries around the world have implemented various energy saving policies. In order to reduce electric energy consumption, various energy saving technologies have been developed worldwide and various devices having high energy efficiency have been developed and distributed.

In order to reduce energy consumption, technology for predicting the amount of power to be consumed has become important. When the amount of power to be consumed is predictable, stable power supply may be achieved and unnecessary power consumption may be reduced.

Base power refers to power that is basically consumed for living, and variable power refers to power that may be consumed depending on a situation.

In order to accurately predict the amount of power to be consumed, technology for accurately predicting variable power rather than base power is required. For example, technology for accurately predicting the amount of power to be consumed by a cooling/heating air conditioner whose power consumption greatly varies depending on weather is required.

Also, technology for reducing predicted variable power is required. For example, technology for controlling a cooling/heating air conditioner to operate in a power saving mode based on an operation pattern of the cooling/heating air conditioner, user information, etc. is required The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus and an operation method of the electronic apparatus.

Another aspect of the disclosure is to provide a method of predicting the amount of power to be consumed by a cooling/heating air conditioner.

Another aspect of the disclosure is to provide a method of controlling a cooling/heating air conditioner to perform a power-saving operation.

Technical problems to be solved by the present embodiment of the disclosure are not limited to the aforementioned technical problems, and may also be applied to equipment whose power consumption varies depending on an external condition.

Also, other technical problems may be inferred from the following embodiments of the disclosure.

Additional aspects will be set forth in part in the description which follows and, in part, will be apparent from the description, or may be learned by practice of the presented embodiments.

In accordance with an aspect of the disclosure, an operation method of an electronic apparatus is provided. The operation method includes obtaining, by the electronic apparatus, weather forecast information, inputting, by the electronic apparatus, the weather forecast information to an artificial intelligence model for predicting an amount of power to be consumed by a first air conditioner, and displaying, by the electronic apparatus, the predicted power consumption amount of the first air conditioner output from the artificial intelligence model, wherein the artificial intelligence model is trained to obtain correlation information between a weather condition and a power consumption amount of an air conditioner based on a weather history and operations of a plurality of air conditioners related to the weather history, and predict the amount of power to be consumed by the first air conditioner based on the correlation information and the weather forecast information.

In accordance with another aspect of the disclosure, an electronic apparatus is provided. The electronic apparatus includes a memory configured to store at least one instruction, a display, and at least one processor coupled to the memory, wherein the at least one instruction, which when executed, configures the at least one processor to obtain weather forecast information, input the weather forecast information to at least one artificial intelligence model for predicting an amount of power to be consumed by a first air conditioner, and control the display to display the predicted power consumption amount of the first air conditioner output from the at least one artificial intelligence model, and wherein the at least one artificial intelligence model is trained to obtain correlation information between a weather condition and a power consumption amount of an air conditioner based on a weather history and operations of a plurality of air conditioners related to the weather history, and predict the amount of power to be consumed by the first air conditioner based on the correlation information and the weather forecast information.

In accordance with another aspect of the disclosure, a non-transitory computer-readable recording medium for solving technical problems may record a program for executing at least one of disclosed methods on a computer.

In accordance with another aspect of the disclosure, an application stored in a non-transitory recording medium for solving the technical problems may be used for executing at least one function from among the disclosed methods.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
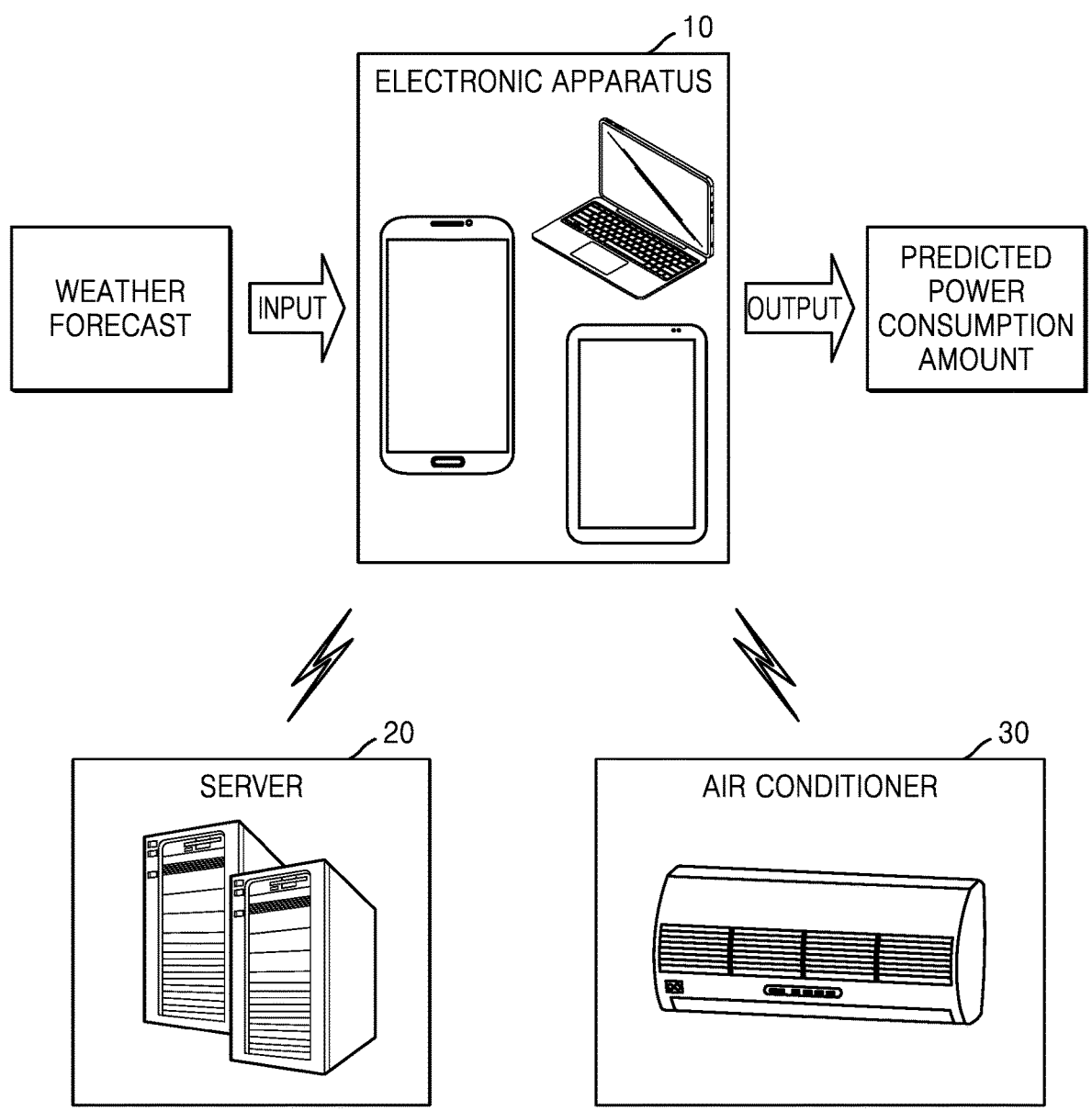
FIG. 1 is a diagram for describing a method of predicting the amount of power to be consumed by an air conditioner, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The same reference numerals denote the same elements throughout the specification. All elements of embodiments of the disclosure are not described in the specification, and descriptions of matters well known in the art to which the disclosure pertains or repeated descriptions between embodiments of the disclosure will be omitted. Terms such as "part" and "portion" used herein denote those that may be embodied by software or hardware. According to embodiments of the disclosure, a plurality of parts or portions may be embodied by a single unit or element, or a single part or portion may include a plurality of units or elements. Operation principles and embodiments of the disclosure will now be explained with reference to the accompanying drawings.

Some embodiments of the disclosure may be described in terms of functional block components and various processing operations. Some or all of such functional blocks may be realized by any number of hardware and/or software components configured to perform specific functions. For example, the functional blocks of the disclosure may be realized by one or more microprocessors or circuit components for a certain function. Furthermore, for example, the functional blocks of the disclosure may be implemented with various programming or scripting languages. The functional blocks may be implemented in algorithms that are executed on one or more processors. Furthermore, the disclosure could employ techniques of the related art for electronics configuration, signal processing, and/or data processing. The terms "mechanism", "element", "means", and "configuration" may be used broadly and are not limited to mechanical or physical embodiments of the disclosure.

Throughout the specification, it will be understood that when a part is referred to as being "connected" to another part, it may be "directly connected" to the other part or "electrically connected" to the other part with intervening elements there between. It will be further understood that when a part "includes" or "comprises" an element, unless otherwise defined, the part may further include other elements, not excluding the other elements.

Furthermore, connecting lines, or connectors shown in the various drawings are intended to represent functional relationships and/or physical or logical couplings between various elements. It should be noted that many alternative or additional functional relationships, physical connections, or logical connections may be present in a practical device.

Throughout the disclosure, the expression "at least one of a, b or c" indicates only a, only b, only c, both a and b, both a and c, both b and c, all of a, b, and c, or variations thereof.

While such terms as "first," "second," etc., may be used to describe various components, such components must not be limited to the above terms. The above terms are used only to distinguish one component from another.

For example, although a first air conditioner is described in the specification, the first air conditioner is used only to be distinguished from other air conditioners and thus should not be limited to the term. Also, although a first control signal and a second control signal are described in the specification, the first control signal and the second control signal are used only to be distinguished from each other and thus should not be limited to the terms. Although a first time, a second time, a third time, and a fourth time are described in the specification, the first time, the second time, the third time, and the fourth time are used only to be distinguished from one another and thus should not be limited to the terms. Also, although a first artificial intelligence (AI) model and a second AI model are described in the specification, the first AI model and the second AI model are used only to be distinguished from each other and thus should not be limited to the terms.

FIG. 1 is a diagram for describing a method of predicting the amount of power to be consumed by an air conditioner according to an embodiment of the disclosure.

Referring to FIG. 1, an electronic apparatus 10 may obtain weather forecast information. The electronic apparatus 10 may predict and output the amount of power to be consumed by an air conditioner 30 to be consumed by the air conditioner 30 based on the obtained weather forecast information.

According to an embodiment of the disclosure, the electronic apparatus 10 may include a mobile device (e.g., a smartphone or a tablet personal computer (PC) including an AI model, and a computing device such as a general-purpose computer (personal computer (PC)) or a server.

Also, the electronic apparatus 10 may include a mobile device (e.g., a smartphone or a tablet PC) for transmitting/receiving data through a network to/from a server 20 including an AI model, and a computing device such as a general-purpose computer (PC).

Also, the electronic apparatus 10 may include an Internet of Things (IoT) device, and a home hub device (e.g., a router or an interactive AI speaker) connected to the server 20 and various IoT devices.

Also, the air conditioner 30 may correspond to the electronic apparatus 10. At least one of a software module or a hardware module included in the air conditioner 30 may function as the electronic apparatus 10 of the following embodiments of the disclosure.

The server 20 may transmit/receive data to/from the electronic apparatus 10 and the air conditioner 30. The server 20 may store received data in a database. Also, the server 20 may perform various computations on the received data.

The air conditioner 30 is a device used to perform cooling or heating in an indoor space that is an air conditioning space. The air conditioner 30 circulates a refrigerant between an indoor unit and an outdoor unit and performs cooling or heating by absorbing ambient heat when a liquid refrigerant evaporates and emitting heat when a gas refrigerant condenses.

An AI-related function according to the disclosure is performed through a processor and a memory. The processor may include at least one processor. In this case, the at least one processor may include a general-purpose processor such as a central processing unit (CPU), an access point (AP), or a digital signal processor (DSP), a graphics processor such as a graphics processing unit (GPU) or a vision processing unit (VPU), or an AI processor such as a neural processing unit (NPU). The at least one processor controls input data to be processed according to a pre-defined operation rule or AI model stored in the memory. Alternatively, when the at least one processor is an AI processor, the AI processor may be designed to have a hardware structure specialized to process a specific AI model.

The pre-defined operation rule or AI model is created through learning. When the pre-defined operation rule or AI model is created through learning, it means that the pre-defined operation rule or AI model set to achieve desired characteristics (or purposes) is created when a basic AI model is trained by using a plurality of training data by using a learning algorithm. The learning may be performed by a device itself in which AI according to the disclosure is used or may be performed through a separate server and/or system. Examples of the learning algorithm include, but are not limited to, supervised learning, unsupervised learning, semi-supervised learning, and reinforcement learning.

The AI model may include a plurality of neural network layers. The plurality of neural network layers may respectively have a plurality of weight values, and each perform a neural network operation through computation among the plurality of weight values and a computation result of a previous layer. The plurality of weight values of the plurality of neural network layers may be optimized by a training result of the AI model. For example, during a learning process, the plurality of weight values may be refined to reduce or minimize a loss value or a cost value obtained by the AI model. An artificial neural network may include a deep neural network (DNN), and examples of the artificial neural network may include, but are not limited to, a convolutional neural network (CNN), a DNN, a recurrent neural network (RNN), a restricted Boltzmann machine (RBM), a deep belief network (DBN), a bidirectional recurrent deep neural network (BRDNN), and a deep Q-network.

According to an embodiment of the disclosure, the AI model may be included in the server 20. The electronic apparatus 10 may transmit weather forecast information to the server 20. The server 20 may apply data received from the electronic apparatus 10 to the AI model, and may transmit data output from the AI model to the electronic apparatus 10.

According to an embodiment of the disclosure, the AI model may be included in the electronic apparatus 10. The electronic apparatus 10 may store and use data for building the AI model in an internal memory. For example, the electronic apparatus 10 may receive the data for building the AI model from the server 20 and may store and use the AI model in the internal memory. Also, the electronic apparatus 10 may receive data for refining the AI model.

The AI model may be generated by learning a plurality of text data and image data input as training data according to a certain criterion. The AI model may generate result data by performing a trained function in response to data input from the electronic apparatus 10, and may output the result data. For example, the AI model may generate result data that predicts the amount of power to be consumed by the air conditioner 30 in response to weather forecast information and may output the result data to the electronic apparatus 10.

The AI model may include a plurality of AI models trained to perform at least one function. For example, the AI models may include a pattern analysis model that is an AI model trained to obtain correlation information indicating a power consumption amount of an air conditioner according to a weather condition, a predicting model that is an AI model trained to predict the amount of power to be consumed by the air conditioner based on the correlation information and weather forecast information, and a control model that is an AI model trained to generate and output a control signal for a power saving operation procedure to be performed by the air conditioner, by learning weather history information, the amount of power consumed by each of a plurality of air conditioners, operation history information of each of the plurality of air conditioners, status information of each of the plurality of air conditioners, and type information of each of the plurality of air conditioners.

According to an embodiment of the disclosure, a pattern analysis model may be trained to obtain feature information about an operation pattern of an air conditioner according to a weather condition from operation history information of the air conditioner. A pattern analysis model may be trained to obtain correlation information indicating a power consumption amount of an air conditioner according to a weather condition based on feature information about an operation pattern of the air conditioner.

An operation pattern of an air conditioner refers to similar operation procedures performed by the air conditioner over time in response to a weather condition. For example, information including a series of operation procedures performed by an air conditioner to control an indoor temperature such as current control of a compressor of the air conditioner, pressure control of the compressor, refrigerant temperature control, and performing/stopping of a cooling operation, a time at which the air conditioner starts an operation, and a time at which the air conditioner ends the operation according to a maximum difference and a minimum difference between indoor and outdoor temperatures may correspond to an operation pattern of the air conditioner. Also, feature information of the operation pattern of the air conditioner refers to the expression of similar operation procedures performed by the air conditioner over time in response to a weather condition by using a vector.

Also, a pattern analysis model may be trained to generate at least one class by clustering air conditioners having similar operation patterns based on feature information of air conditioners. The pattern analysis model may be trained to obtain, for each class, correlation information indicating power consumption amounts of the air conditioners according to a weather condition based on the feature information about the operation patterns of the air conditioners included in the classes.

According to an embodiment of the disclosure, an AI model may be included in a plurality of devices. For example, a pattern analysis model, a predicting model, and a control model may be respectively included in different devices. In detail, the pattern analysis model may be built in the air conditioner 30, the predicting model may be built in the server 20, and the control model may be built in the electronic apparatus 10. It is obvious that two or more AI models may be included in one device.

As another example, a first pattern analysis model for obtaining feature information about an operation pattern of an air conditioner according to a weather condition may be built in the air conditioner 30, and a second pattern analysis model for obtaining correlation information indicating a power consumption amount of the air conditioner according to the weather condition based on the feature information about the operation pattern of the air conditioner may be built in the server 20.

Weather history information refers to information about a past weather history. The weather history information may include information indicating a history of a weather condition including a temperature, a humidity, a fine dust concentration, an ozone concentration, an ultraviolet index, and a wind speed of each region. The weather history information may be recorded in a certain time unit such as an hour, a day, a week, or a month.

Weather forecast information refers to information indicating a predicted weather condition in the future. The weather forecast information may include predicted information of a weather condition including a temperature, a humidity, a fine dust concentration, an ozone concentration, an ultraviolet index, and a wind speed of each region. The weather forecast information may be obtained in a certain time unit such as an hour, a day, a week, or a month.

Operation history information of the air conditioner 30 is information indicating a history of operations performed by the air conditioner 30. The operation history information of the air conditioner 30 may include log data of the air conditioner 30. For example, the operation history information of the air conditioner 30 may include a series of information recorded while the air conditioner 30 operates such as a time at which a user uses the air conditioner 30, a time at which the user ends the use of the air conditioner 30, a highest desired temperature set by the user, a lowest desired temperature set by the user, a maximum difference between indoor and outdoor temperatures, a minimum difference between indoor and outdoor temperatures, and an operation mode performed by the air conditioner 30 during a certain period of time. The operation history information of the air conditioner 30 may be recorded in a certain time unit such as an hour, a day, a week, or a month.

Status information of the air conditioner 30 may be information indicating a status of the air conditioner 30. The status information of the air conditioner 30 may be information about a status of the air conditioner 30 itself and information about a status around the air conditioner 30.

For example, information about a status of the air conditioner 30 itself may include information about a power status of the air conditioner 30, an operation performed by the air conditioner 30, a time at which the user uses the air conditioner 30, a time at which the user ends the use, a highest desired temperature set by the user, and a lowest desired temperature set by the user.

For example, information about a status around the air conditioner 30 may include information about a region where the air conditioner 30 is installed (e.g., Seoul, Busan, Daejeon, Daegu, Gwangju, Incheon, Ulsan, Gangneung, or Jeju Island) and information about a location where the air conditioner 30 is installed (e.g., a house, an apartment, or an office).

Type information of the air conditioner 30 may be information indicating a type of the air conditioner 30. For example, the type information of the air conditioner 30 may include information indicating a type of the air conditioner 30 such as a wall mounted type, a window type, or a stand type.

According to an embodiment of the disclosure, the electronic apparatus 10 may rapidly and accurately predict the amount of power to be consumed by the air conditioner 30 by using an AI model.

Figure 2:
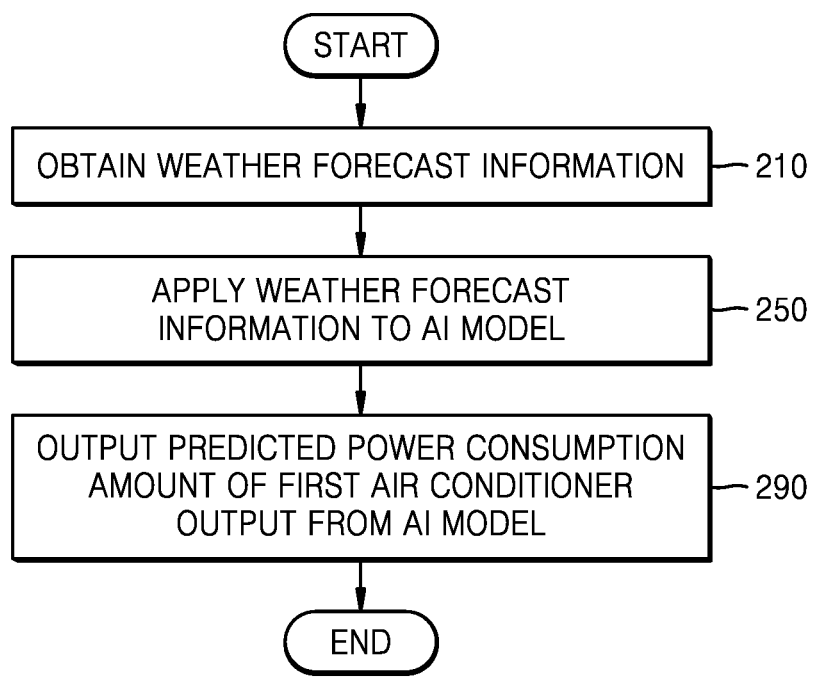
FIG. 2 is a flowchart of a method, performed by an electronic apparatus, of predicting the amount of power to be consumed by an air conditioner, according to an embodiment of the disclosure.

FIG. 2 is a flowchart of a method, performed by an electronic apparatus, of predicting the amount of power to be consumed by an air conditioner according to an embodiment of the disclosure.

Referring to FIG. 2, in operation 210, the electronic apparatus 10 may obtain weather forecast information.

According to an embodiment of the disclosure, the electronic apparatus 10 may obtain the weather forecast information from at least one server (e.g., a server of the Meteorological Administration) that transmits the weather forecast information. For example, the electronic apparatus 10 may obtain the weather forecast information by accessing the server of the Meteorological Administration whenever a preset time elapses.

In operation 250, the electronic apparatus 10 may apply the obtained weather forecast information to an AI model. The AI model may include at least one predicting model trained to predict the amount of power to be consumed by an air conditioner based on the weather forecast information.

The AI model will be described below in detail with reference to FIG. 3.

Operations 210 and 250 are not essential operations. Operation 290 may be performed by the electronic apparatus 10 without performing operations 210 and 250. That is, the server 20, instead of the electronic apparatus 10, may obtain the weather forecast information.

For example, the electronic apparatus 10 may control the server 20 including the AI model to obtain the weather forecast information from at least one server (e.g., the server of the Meteorological Administration) that transmits the weather forecast information.

Alternatively, the server 20 may obtain the weather forecast information from at least one server (e.g., the server of the Meteorological Administration) that transmits the weather forecast information, without being controlled by the electronic apparatus 10.

Alternatively, the AI model may be trained to obtain the weather forecast information by accessing at least one server (e.g., the server of the Meteorological Administration) that transmits the weather forecast information whenever a preset time elapses.

In operation 290, the electronic apparatus 10 may display, on a display, a predicted power consumption amount of the air conditioner 30 which is output from the AI model.

According to an embodiment of the disclosure, the electronic apparatus 10 may display the predicted power consumption amount to be consumed by the air conditioner 30 during a certain period of time after the present time.

According to an embodiment of the disclosure, the electronic apparatus 10 may display the predicted power consumption amount in a certain time unit such as an hour, a day, a week, or a month.

A method, performed by the electronic apparatus 10, of displaying a predicted power consumption amount will be described below in detail with reference to FIG. 10.

Figure 3:
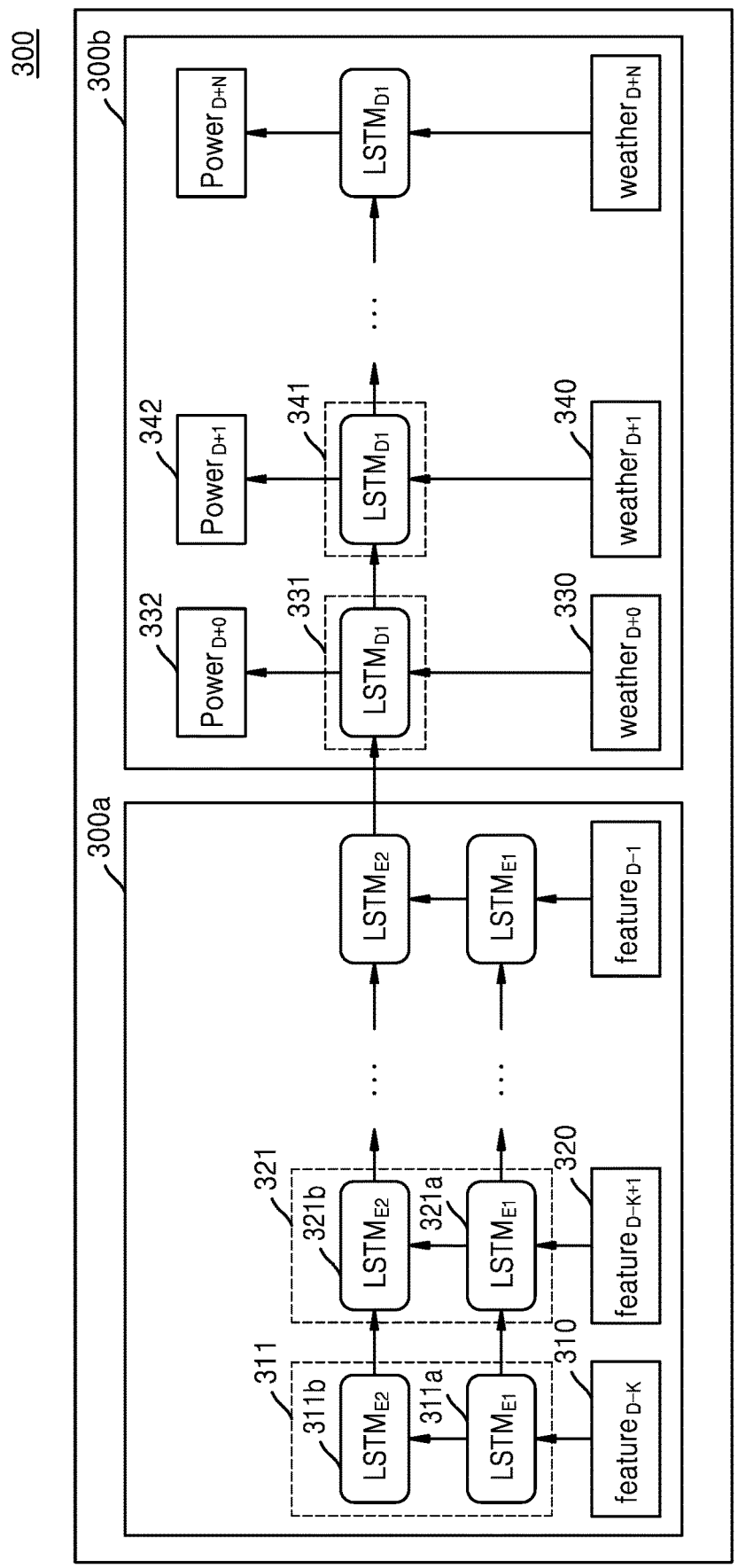
FIG. 3 is a block diagram of an artificial intelligence (AI) model for predicting the amount of power to be consumed by an air conditioner, according to an embodiment of the disclosure.

FIG. 3 is a block diagram of an AI model for predicting the amount of power to be consumed by an air conditioner according to an embodiment of the disclosure.

Referring to FIG. 3, an AI model 300 may predict the amount of power to be consumed by the air conditioner 30 based on weather forecast information and output the amount of power.

The AI model 300 may include a pattern analysis model 300a and a predicting model 300b.

The pattern analysis model 300a is a model trained to obtain correlation information indicating a relationship between a weather condition and a power consumption amount of the air conditioner 30 by learning training data 310 and 320.

The pattern analysis model 300a may obtain the correlation information by learning the amount of power consumed by the air conditioner 30 and operation history information of the air conditioner 30 in each preset time unit as training data. Alternatively, the pattern analysis model 300a may obtain feature information about an operation pattern of the air conditioner 30 by learning the operation history information of the air conditioner 30 in each preset time unit as training data.

Also, the predicting model 300b is a model trained to predict the amount of power to be consumed by the air conditioner 30 based on the correlation information and the weather forecast information.

The training data 310 and 320 may include at least one of weather history information, the amount of power consumed by each of a plurality of air conditioners, operation history information of each of the plurality of air conditioners, status information of each of the plurality of air conditioners, or type information of each of the plurality of air conditioners.

Because it is difficult to accurately obtain correlation information between a weather status and a power consumption amount of an air conditioner by using training data obtained from one air conditioner, it is preferable that the pattern analysis model 300a learns data by using training data obtained from a plurality of air conditioners.

Also, the AI model 300 may include a control model (not shown) for generating and outputting a control signal for a power saving operation procedure to be performed by the air conditioner 30. For example, the control model may generate and output a control signal for a condition under which the air conditioner 30 is to start a cooling operation (e.g., a cooling operation start time, an indoor/outdoor temperature difference, and a degree of indoor temperature rise per certain time) and a condition under which the air conditioner 30 is to end the cooling operation (e.g., a cooling operation end time, an indoor/outdoor temperature difference, and a degree of indoor temperature drop per certain time).

According to an embodiment of the disclosure, the pattern analysis model 300a and the predicting model 300b may be built together in one device. For example, the pattern analysis model 300a and the predicting model 300b may be built together in the electronic apparatus 10. Alternatively, the pattern analysis model 300a and the predicting model 300b may be built together in the server 20. Alternatively, the pattern analysis model 300a and the predicting model 300b may be built together in the air conditioner 30.

According to an embodiment of the disclosure, the pattern analysis model 300a and the predicting model 300b may be built in different devices. For example, the pattern analysis model 300a may be built in the server 20, and the predicting model 300b may be built in the electronic apparatus 10.

According to an embodiment of the disclosure, the pattern analysis model 300a and the predicting model 300b may be refined by learning new training data as time passes.

According to an embodiment of the disclosure, the pattern analysis model 300a and the predicting model 300b may be built by using an AI algorithm of sequentially learning data over time.

For example, the pattern analysis model 300a may learn training data on a certain time by using an AI algorithm such as recurrent neural network a (RNN) or long short term memory (LSTM). Also, the predicting model 300b may sequentially predict the amount of power to be consumed by the air conditioner 30 by using an AI algorithm such as an RNN or LSTM.

In detail, the pattern analysis model 300a may input the training data 310 on a first duration before the present time to an LSTM unit 311. The LSTM unit 311 may obtain correlation information indicating a power consumption amount of an air conditioner according to a weather condition of the first duration by learning the training data 310.

Also, the pattern analysis model 300a may input the training data 320 on a second duration after the first duration to an LSTM unit 321. The LSTM unit 321 may obtain and output correlation information indicating a power consumption amount of an air conditioner according to a weather condition of the first duration and the second duration by learning the training data 320.

The pattern analysis model 300a may accurately analyze a relationship between a power consumption amount of an air conditioner and a weather condition from the training data 310 and 320 including various time series data, by using the LSTM units 311 and 321.

According to an embodiment of the disclosure, the LSTM units 311 and 321 may reuse obtained correlation information as training data, to obtain a plurality of pieces of correlation information. The LSTM units 311 and 321 may respectively output the obtained plurality of pieces of correlation information.

For example, the LSTM units 311 and 321 may receive correlation information output from the LSTM units 311 and 321 as training data again.

Alternatively, the LSTM units 311 and 321 may receive output correlation information as training data again by using a plurality of LSTM units included in the LSTM units 311 and 321.

In detail, the LSTM unit 311 may include a first LSTM unit 311a and a second LSTM unit 311b. The LSTM unit 311 may input the training data 310 to the first LSTM unit 311a. The first LSTM unit 311a may input first correlation information obtained based on the training data 310 to the LSTM unit 321 and the second LSTM unit 311b. The second LSTM unit 311b may input second correlation information obtained based on the first correlation information to the LSTM unit 321.

Also, the LSTM unit 321 may include a first LSTM unit 321a and a second LSTM unit 321b. The first LSTM unit 321a may input third correlation information obtained based on the training data 320 and the first correlation information to the second LSTM unit 321b. The second LSTM unit 321b may obtain fourth correlation information based on the training data 320, the second correlation information, and the third correlation information. The LSTM unit 321 may input the fourth correlation information to an LSTM unit 331 of the predicting model 300b.

The number of a plurality of LSTM units included in the LSTM units 311 and 321 may be determined according to a type and an amount of the training data 310 and 320. However, in order to prevent overfitting, it is preferable that the LSTM unit 311 includes two LSTM units 311a and 311b and the LSTM unit 321 includes two LSTM units 321a and 321b.

Because the LSTM units 311 and 321 use obtained correlation information as training data again, the LSTM units 311 and 321 may accurately analyze a relationship between a power consumption amount of an air conditioner and a weather condition from the training data 310 and 320 including various time series data.

The predicting model 300b may input weather forecast information of a third duration after the present time to the LSTM unit 331. The LSTM unit 331 may predict and output the amount of power 332 to be consumed by the air conditioner 30 during the third duration based on the weather forecast information 330 and correlation information output from the pattern analysis model 300a. Also, the predicting model 300b may input correlation information output from the LSTM unit 331 and weather forecast information 340 on a fourth duration after the third duration to an LSTM unit 341. The LSTM unit 341 may predict and output the amount of power 342 to be consumed by the air conditioner 30 during the fourth duration based on the weather forecast information 340 and the correlation information.

According to an embodiment of the disclosure, the pattern analysis model 300a may be trained to obtain feature information about operation patterns of a plurality of air conditioners according to a weather condition by learning weather history information during the first duration before the present time and operation history information of each of the plurality of air conditioners during the first duration.

The pattern analysis model 300a may obtain feature information about general operation patterns of a plurality of air conditioners according to a weather condition.

Feature information about an operation pattern of an air conditioner may include pattern-related information including a series of operation procedures performed by the air conditioner to control an indoor temperature such as current control of a compressor of the air conditioner, pressure control of the compressor, refrigerant temperature control, and performing/stopping of a cooling operation, a time at which the air conditioner starts an operation, and a time at which the air conditioner ends the operation. Operation pattern information may be expressed by using a vector.

For example, the pattern analysis model 300a may obtain feature information about an operation pattern of an air conditioner for current control of a compressor, pressure control, and refrigerant temperature control according to a highest temperature during the first duration. Also, the pattern analysis model 300a may obtain operation pattern information of an air conditioner such as current control of a compressor, pressure control, refrigerant temperature control, and performing/stopping of a cooling operation according to a difference between an indoor temperature and an outdoor temperature during the first duration. Also, the pattern analysis model 300a may obtain feature information about an operation pattern of an air conditioner for current control of a compressor, pressure control, and refrigerant temperature control according to a humidity during the first duration. Also, the pattern analysis model 300a may obtain information about a change in a lowest desired temperature of a user according to a highest temperature during the first duration. Also, the pattern analysis model 300a may obtain information about a change in a lowest desired temperature of a user according to a difference between an indoor temperature and an outdoor temperature during the first duration. Also, the pattern analysis model 300a may obtain information about a change in a lowest desired temperature of a user according to a humidity during the first duration.

According to an embodiment of the disclosure, the pattern analysis model 300a may obtain information about the amount of power consumed by an air conditioner according to an operation pattern of the air conditioner. For example, the pattern analysis model 300a may obtain information about a power consumption amount of an air conditioner according to current control of a compressor, pressure control of the compressor, refrigerant temperature control, and performing/stopping of a cooling operation.

According to an embodiment of the disclosure, the pattern analysis model 300a may obtain correlation information indicating a power consumption amount of an air conditioner according to a weather condition based on an operation pattern of the air conditioner. The pattern analysis model 300a may obtain correlation information indicating a power consumption amount of an air conditioner according to a weather condition from feature information about an operation pattern of the air conditioner according to the weather condition and information about the amount of power consumed by the air conditioner according to the operation pattern.

The predicting model 300b may predict the amount of power to be consumed by the air conditioner 30 based on correlation information and weather forecast information obtained based on an operation pattern of the air conditioner 30. For example, the predicting model 300b may predict the amount of power to be consumed by the air conditioner 30, based on a weather condition obtained from weather forecast information and correlation information including feature information about an operation pattern of the air conditioner 30 and information about the amount of power consumed by the air conditioner 30 according to the operation pattern of the air conditioner 30.

Figure 4:
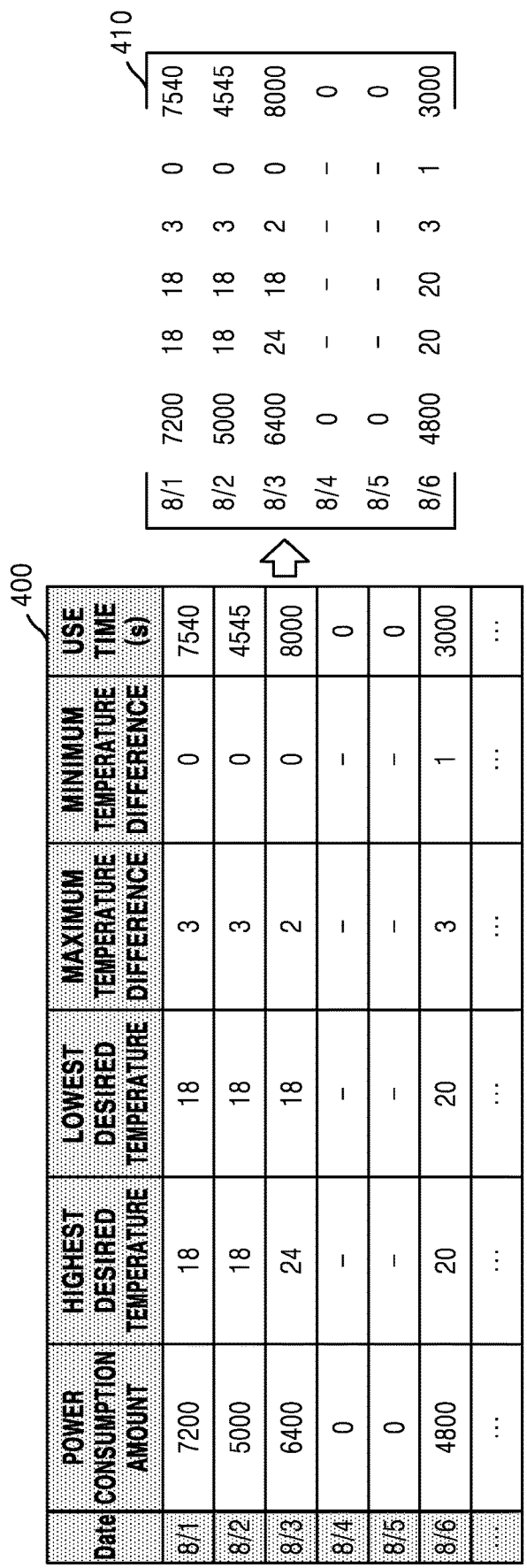
FIG. 4 illustrates that operation history information of an air conditioner input to an AI model is converted into a matrix, according to an embodiment of the disclosure.
Figure 5:
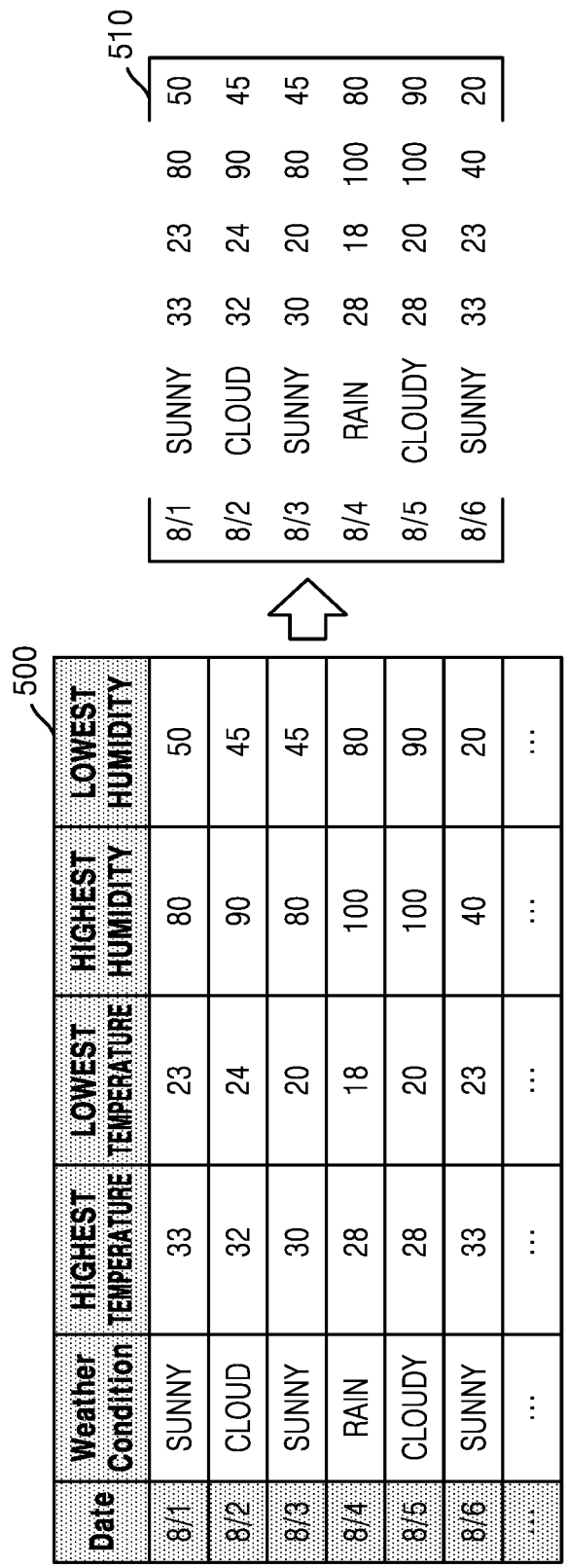
FIG. 5 illustrates that weather history information input to an AI model is converted into a matrix, according to an embodiment of the disclosure.

FIGS. 4 and 5 illustrate that preprocessing is performed on pieces of information input to an AI model according to various embodiments of the disclosure.

FIG. 4 illustrates that operation history information of an air conditioner input to an AI model is converted into a matrix according to an embodiment of the disclosure.

FIG. 5 illustrates that weather history information input to an AI model is converted into a matrix according to an embodiment of the disclosure.

Referring to FIGS. 4 and 5, preprocessing may be performed on training data in order to apply the training data to the pattern analysis model 300a.

According to an embodiment of the disclosure, a processor 13 of the electronic apparatus 10 may perform preprocessing on operation history information 400 of the air conditioner 30 obtained from the air conditioner 30. Also, the processor 13 of the electronic apparatus 10 may perform preprocessing on weather history information 500 obtained from at least one server (e.g., a server of the Meteorological Administration) that transmits the weather history information.

According to an embodiment of the disclosure, a processor 23 of the server 20 may perform preprocessing on training data. The processor 23 of the server 20 may perform preprocessing on the operation history information 400 of the air conditioner 30 received from the electronic apparatus 10 or the air conditioner 30. Also, the processor 23 of the server 20 may perform preprocessing on the weather history information 500 obtained from at least one server (e.g., the server of the Meteorological Administration) that transmits the weather history information.

According to an embodiment of the disclosure, the AI model 300 may be trained to perform preprocessing on input training data. For example, the AI model 300 may be trained to perform preprocessing on the operation history information 400 of the air conditioner 30 input from the electronic apparatus 10 or the server 20. Also, the AI model 300 may be trained to perform preprocessing on the weather history information 500 input from the electronic apparatus 10 or the server 20.

Referring to FIG. 4, preprocessing of converting the operation history information 400 of the air conditioner 30 into a matrix 410 may be performed. The operation history information 400 of the air conditioner 30 may be collected in real time and may be recorded in a certain time unit such as an hour, a day, a week, or a month.

The operation history information 400 of the air conditioner 30 may be converted into the matrix 410 to include a certain duration and a series of pieces of information recorded as the air conditioner 30 operates during the certain duration. The operation history information 400 of the air conditioner 30 converted into the matrix 410 may be data (e.g., a minimum value, a maximum value, a sum, an average value, and a change amount) obtained after a series of pieces of information recorded as the air conditioner 30 operates are processed.

For example, the operation history information 400 of the air conditioner 30 where a power consumption amount of the air conditioner 30, a lowest desired temperature of a user, a highest desired temperature, a maximum difference between indoor and outdoor temperatures, a minimum difference between indoor and outdoor temperatures, and a use time of the air conditioner are recorded for each day may be converted into the matrix 410. Also, operation history information of the air conditioner 30 including a current control time of a compressor of the air conditioner 30, a current amount of the compressor, a pressure control time of the compressor, a pressure amount of the compressor, a refrigerant temperature control time, a refrigerant real-time temperature, and a time at which a cooling operation is performed/stopped may be converted into a matrix.

Referring to FIG. 5, preprocessing of converting weather history information 500 into a matrix 510 may be performed. The weather history information 500 may be collected and recorded in a certain time unit such as an hour, a day, a week, or a month. The weather history information 500 may be converted into the matrix 510 to include a series of pieces of information used to record weather such as a temperature, a humidity, a fine dust concentration, an ozone concentration, an ultraviolet index, a wind speed, and a weather condition of each region.

For example, the weather history information 500 including a weather condition, a highest temperature, a lowest temperature, a highest humidity, a lowest humidity, a fine dust concentration, an ozone concentration, an ultraviolet index, and a wind speed obtained for each day may be converted into the matrix 510.

Preprocessing may be performed even on weather forecast information applied to the AI model 300. A processor of the electronic apparatus 10 or a processor of the server 20 may perform preprocessing on weather forecast information obtained from at least one server (e.g., the server of the Meteorological Administration) that transmits the weather forecast information. The AI model 300 may perform preprocessing on weather forecast information input from the electronic apparatus 10 or the server 20.

Preprocessing performed on weather forecast information may be similar to preprocessing performed on weather history information described with reference to FIG. 5. For example, weather forecast information including a weather condition, a highest temperature, a lowest temperature, a highest humidity, a lowest humidity, a fine dust concentration, an ozone concentration, an ultraviolet index, and a wind speed obtained for each time and each day may be converted into a matrix.

Figure 6A:
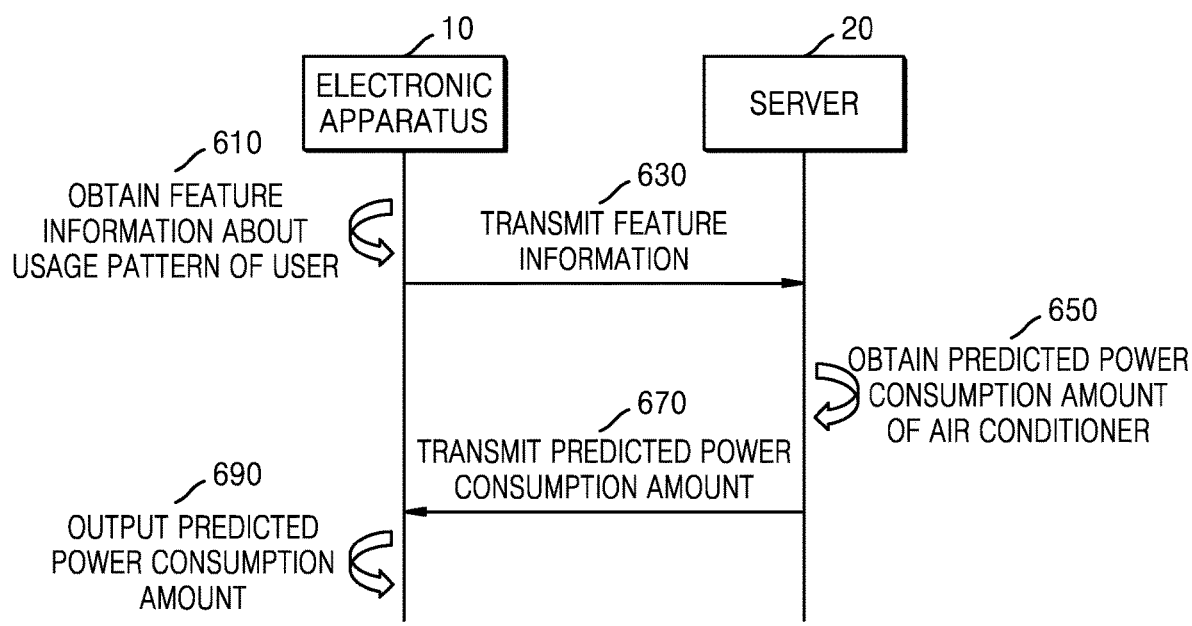
FIG. 6A is a flowchart related to operations of an electronic apparatus and a server using an AI model, according to an embodiment of the disclosure.

FIG. 6A is a flowchart related to operations of an electronic apparatus and a server using an AI model according to an embodiment of the disclosure.

Figure 6B:
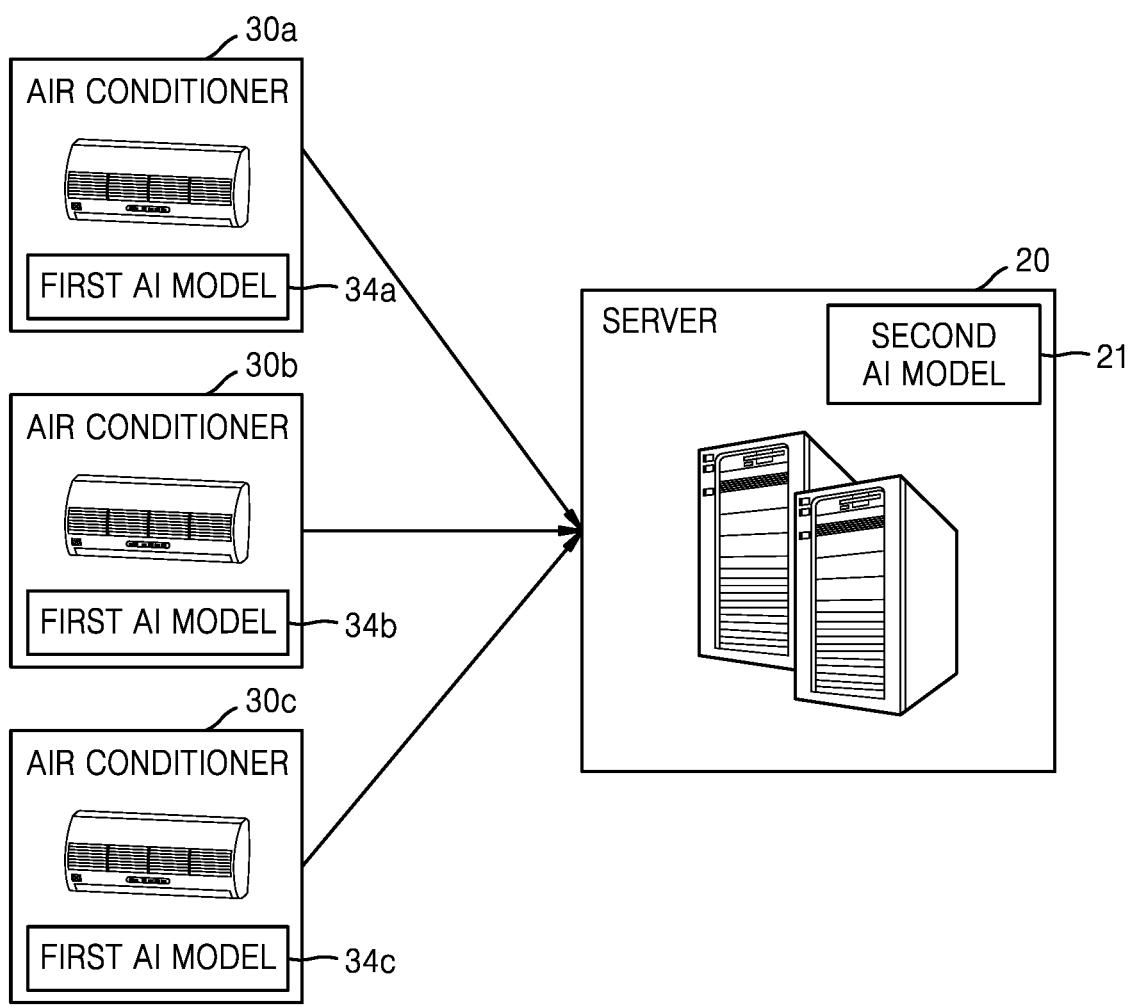
FIG. 6B illustrates operations of an electronic apparatus and a server using an AI model, according to an embodiment of the disclosure.

FIG. 6B illustrates operations of an electronic apparatus and a server using an AI model according to an embodiment of the disclosure.

According to an embodiment of the disclosure, the electronic apparatus 10 may receive operation history information of the air conditioner 30 from the air conditioner 30, and may include a mobile device for transmitting/receiving data through a network to/from the server 20 and a computing device such as a general-purpose computer.

Alternatively, according to another embodiment of the disclosure, the electronic apparatus 10 may be the air conditioner 30, or may correspond to at least one hardware module or software module included in the air conditioner 30.

Referring to FIG. 6A, in operation 610, the electronic apparatus 10 may obtain feature information about a user's usage pattern of an air conditioner or an operation pattern of the air conditioner by using a first AI model. The electronic apparatus 10 may obtain operation history information from the air conditioner 30 and may input the operation history information to the first AI model. The first AI model may be trained to obtain feature information about an operation pattern of an air conditioner from operation history information of the air conditioner. The feature information of the operation pattern of the air conditioner may be expressed by using a vector.

For example, a mobile device including the first AI model may obtain operation history information of a first air conditioner from the first air conditioner through a home network. The mobile device may apply the operation history information of the first air conditioner to the first AI model, and may obtain a vector value indicating an operation pattern of the first air conditioner output from the first AI model.

As another example, the first air conditioner including the first AI model may store an operation of the first air conditioner as log data. The first air conditioner may input the log data to the first AI model, and may obtain a vector value indicating a usage pattern of the first air conditioner output from the first AI model.

Referring to FIG. 6B, air conditioners 30a, 30b, and 30c may respectively include first AI models 34a, 34b, and 34c. The first AI model may be an AI model for performing at least some of functions of a pattern analysis model. For example, the first AI model may be trained to obtain feature information about an operation pattern of an air conditioner from operation history information of the air conditioner.

In operation 630, the electronic apparatus 10 may transmit feature information about an operation pattern of an air conditioner output from each of the first AI models 34a, 34b, and 34c to the server 20.

For example, the mobile device may transmit a vector value indicating the usage pattern of the first air conditioner to the server 20. Alternatively, the first air conditioner may transmit a vector value indicating the usage pattern of the first air conditioner output from the first AI model to the server 20.

Alternatively, in operation 630, each of the air conditioners 30a, 30b, and 30c may transmit feature information about an operation pattern of an air conditioner output from each of the first AI models 34a, 34b, and 34c of the air conditioners 30a, 30b, and 30c to the server 20.

Because the electronic apparatus 10 transmits a vector value indicating the usage pattern of the first air conditioner generated by using the first AI model to the server 20, without transmitting operation history information of the first air conditioner in each preset time unit to the server 20, the user's privacy may be protected. Also, the amount of data transmitted by the electronic apparatus 10 to the server 20 may be reduced and the amount of data to be processed by the server 20 may also be reduced.

In operation 650, the server 20 may obtain a predicted power consumption amount of the first air conditioner by applying the feature information about the usage pattern of the first air conditioner received from the electronic apparatus 10 to a second AI model 21.

Alternatively, the server 20 may obtain a predicted power amount to be consumed by each of the air conditioners 30a, 30b, and 30c by applying feature information about a usage pattern of each of the air conditioners 30a, 30b, and 30c respectively received from the air conditioners 30a, 30b, and 30c to the second AI model 21.

The second AI model 21 may obtain first correlation information indicating a power consumption amount of the first air conditioner according to a weather condition by learning feature information about the usage pattern of the first air conditioner, weather history information, and the amount of power consumed by the first air conditioner. Also, the second AI model 21 may output a predicted power consumption amount of the first air conditioner by predicting the amount of power to be consumed by the first air conditioner based on the first correlation information and weather forecast information.

In operation 670, the server 20 may transmit the predicted power consumption amount of the first air conditioner to the electronic apparatus 10. For example, the server 20 may transmit the predicted power consumption amount of the first air conditioner in each preset time unit to the electronic apparatus 10.

Also, the server 20 may transmit a control signal for a power saving operation procedure to be performed by the first air conditioner along with the predicted power consumption amount of the first air conditioner to the electronic apparatus 10. The control signal may be generated by the second AI model 21.

In operation 690, the electronic apparatus 10 may output the predicted power consumption amount of the first air conditioner transmitted from the server 20. The electronic apparatus 10 may output, through a display, the predicted power consumption amount of the first air conditioner by using various display means such as letters, numbers, figures, and graphs. Also, the electronic apparatus 10 may output the predicted power consumption amount of the first air conditioner as sound through a speaker.

For example, the mobile device may output the predicted power consumption amount of the first air conditioner through the display whenever a preset time elapses. As another example, the first air conditioner may display the predicted power consumption amount of the first air conditioner on a display of the air conditioner. As another example, the first air conditioner may display the predicted power consumption amount of the first air conditioner on a display of a mobile device connected to the first air conditioner.

Figure 7:
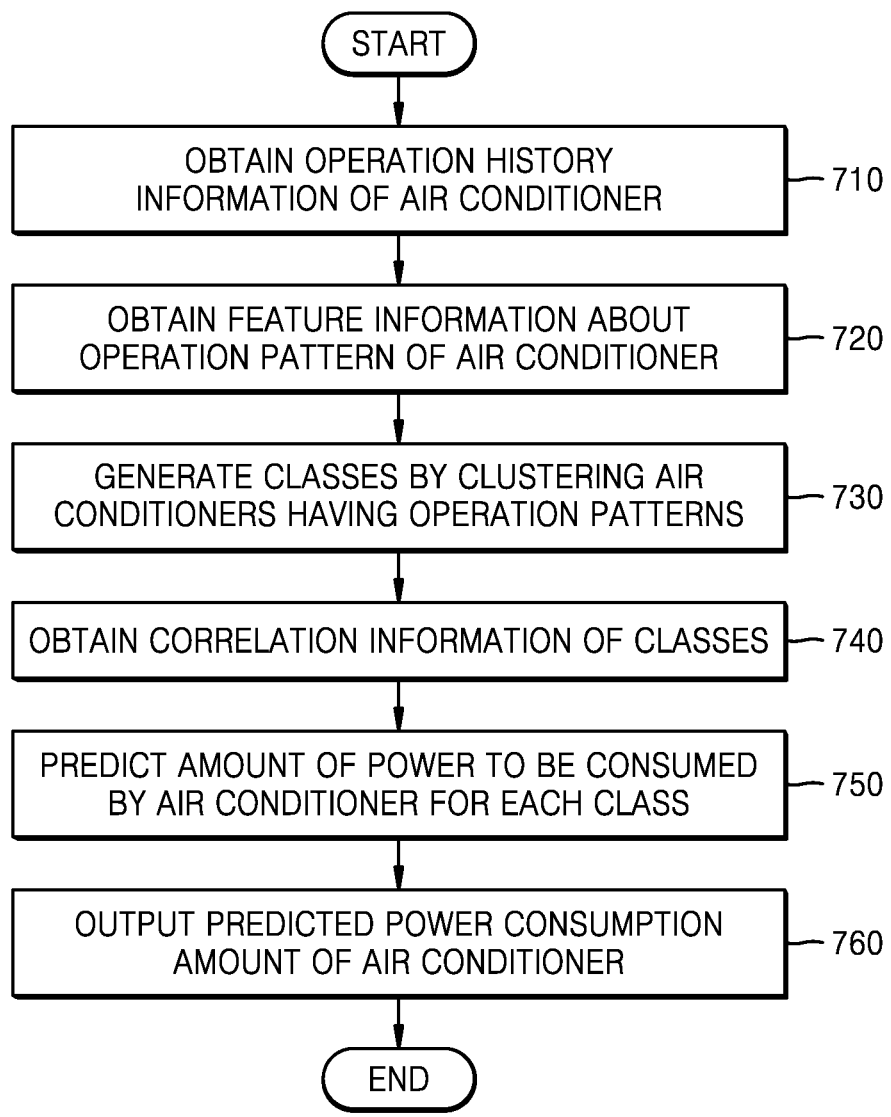
FIG. 7 is a flowchart of a method of obtaining a predicted power consumption amount of an air conditioner, according to an embodiment of the disclosure.

FIG. 7 is a flowchart of a method of obtaining a predicted power consumption amount of an air conditioner according to an embodiment of the disclosure.

Figure 8:
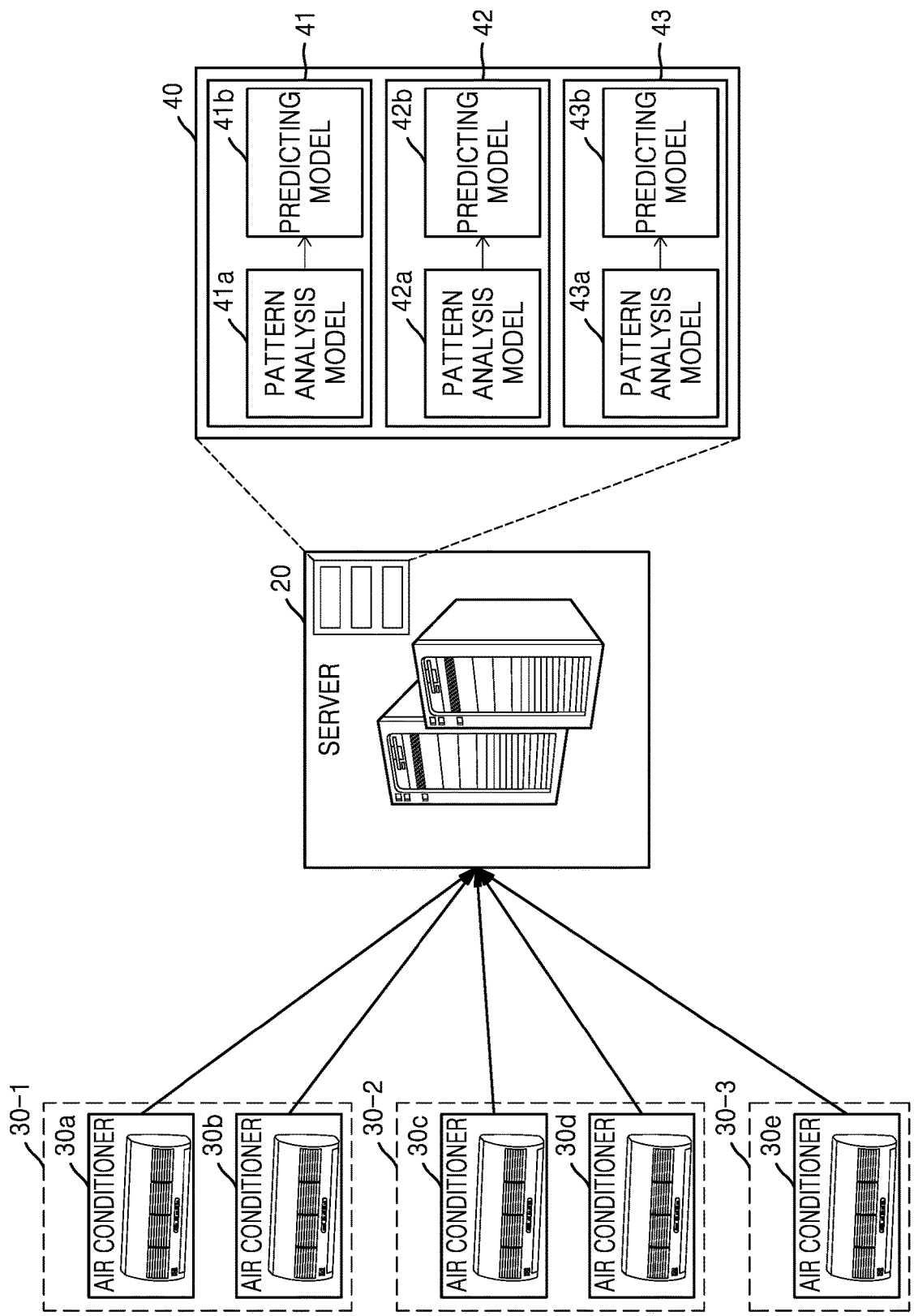
FIG. 8 illustrates that an AI model is generated according to classes in which air conditioners are classified, according to an embodiment of the disclosure.

FIG. 8 illustrates that an AI model is generated for each class according to an embodiment of the disclosure.

In operation 710, the server 20 may obtain operation history information of each of a plurality of air conditioners 30a, 30b, 30c, 30d, and 30e. For example, the server 20 may receive operation history information from each of the plurality of air conditioners 30a, 30b, 30c, 30d, and 30e.

Alternatively, the server 20 may obtain operation history information of the first air conditioner 30 from the electronic apparatus 10. The electronic apparatus 10 may receive the operation history information of the first air conditioner 30 from the first air conditioner 30, and may include a mobile device for transmitting/receiving data through a network to/from the server 20 and a computing device such as a general-purpose computer. Alternatively, the electronic apparatus 10 may be each of the air conditioners 30a, 30b, 30c, 30d, and 30e, or may correspond to at least one hardware module or software module included in each of the air conditioners 30a, 30b, 30c, 30d, and 30e.

In operation 720, the server 20 may obtain feature information about an operation pattern of each of the plurality of air conditioners 30a, 30b, 30c, 30d, and 30e by applying the obtained operation history information of each of the plurality of air conditioners 30a, 30b, 30c, 30d, and 30e to the AI model 40. The feature information may be expressed by using a vector.

Operations 710 and 720 may not be essential operations. The server 20 may receive, from each of the plurality of air conditioners 30a, 30b, 30c, 30d, and 30e, the feature information about the operation pattern of each of the plurality of the air conditioners 30a, 30b, 30c, 30d, and 30e generated based on the operation history information of each of the plurality of air conditioners 30a, 30b, 30c, 30d, and 30e. Alternatively, the server 20 may receive feature information about an operation pattern of the first air conditioner 30 from the electronic apparatus 10 that receives the operation history information from the first air conditioner 30. The first air conditioner 30 or the electronic apparatus 10 that transmits the feature information to the server 20 may include an AI model 40 trained to output feature information about an operation pattern generated based on the operation history information of the first air conditioner 30.

In operation 730, the server 20 may generate classes 30-1, 30-2, and 30-3 by clustering air conditioners having similar operation patterns based on the feature information about the operation pattern of each of the plurality of air conditioners 30a, 30b, 30c, 30d, and 30e.

For example, the server 20 may identify a similarity between vector values indicating the operation patterns of the plurality of air conditioners 30a, 30b, 30c, 30d, and 30e. The server 20 may allocate the same label to a plurality of air conditioners having similar pieces of feature information about operation patterns, and may classify the plurality of air conditioners to which the same label is allocated into the same class. A plurality of labels may be allocated to air conditioners. The server 20 may include an AI model trained to identify a similarity between vector values indicating operation patterns of a plurality of air conditioners and allocate labels.

In detail, from among the plurality of air conditioners 30a, 30b, 30c, 30d, and 30e, the server 20 may cluster the air conditioners 30a and 30b into a first class 30-1, may cluster the air conditioners 30c and 30d into a second class 30-2, and may cluster the air conditioner 30e into a third class 30-3. The server 20 may include one or more AI models 41, 42, and 43 for predicting a power consumption amount of a plurality of air conditioners classified into the same class.

In operation 740, the server 20 may obtain correlation information indicating a power consumption amount of a plurality of air conditioners classified into the same class according to a weather condition. For example, the server 20 may include pattern analysis models 41a, 42a, and 43a respectively trained to obtain and output correlation information of the classes 30-1, 30-2, and 30-3. The pattern analysis model 41a may obtain and output first correlation information indicating a power consumption amount of the air conditioners 30a and 30b included in the first class 30-1 according to a weather condition, based on the amount of power consumed by each of the air conditioners 30a and 30b included in the first class 30-1, operation history information of each of the air conditioners 30a and 30b, status information of each of the air conditioners 30a and 30b, and weather history information.

In operation 750, the server 20 may predict the amount of power to be consumed by an air conditioner based on correlation information and weather forecast information. For example, the server 20 may include predicting models 41b, 42b, and 43b each trained to predict the amount of power to be consumed by an air conditioner based on correlation information and weather forecast information obtained for each of the classes 30-1, 30-2, and 30-3. The predicting model 41a may obtain and output a predicted power consumption amount of the first air conditioner 30a included in the first class 30-1 based on the first correlation information and weather forecast information.

In operation 760, the server 20 may output a predicted power consumption amount of an air conditioner. For example, the server 20 may transmit a predicted power consumption amount of the first air conditioner 30a to the first air conditioner 30a. Alternatively, the server 20 may transmit the predicted power consumption amount of the first air conditioner 30a to the electronic apparatus 10 connected to the first air conditioner 30a. The server 20 may include a web server that outputs information about the predicted power consumption amount of the first air conditioner 30a. The electronic apparatus 10 may obtain and display information about the predicted power consumption amount of the first air conditioner 30a by accessing the web server.

According to an embodiment of the disclosure, because the server 20 classifies air conditioners having similar operation patterns, the server 20 may accurately obtain a predicted power consumption amount according to an operation pattern of an air conditioner. Also, the server 20 may generate a control signal for the air conditioners having similar operation patterns.

Figure 9A:
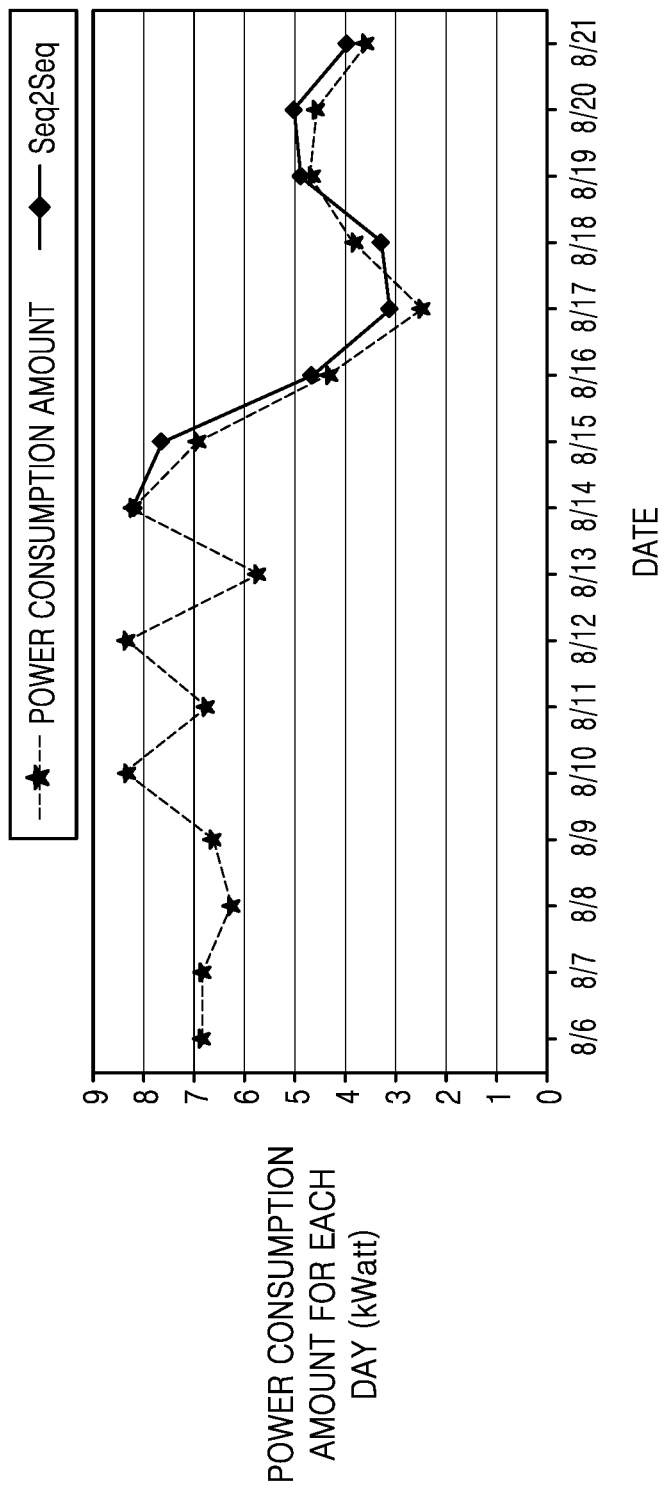
FIG. 9A is a graph illustrating a result of predicting the amount of power to be consumed by an air conditioner by using an AI model, according to an embodiment of the disclosure.
Figure 9B:
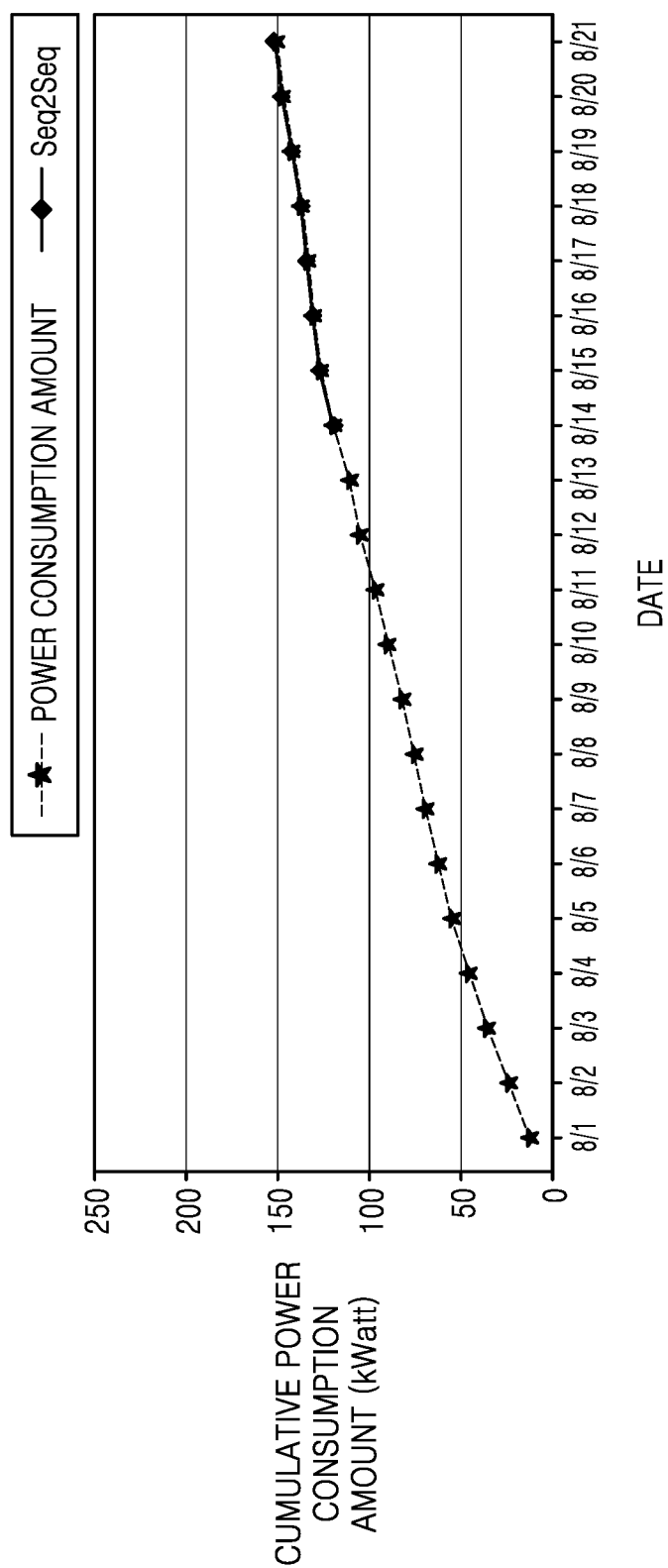
FIG. 9B is a graph illustrating a result of obtaining the amount of power to be consumed by an air conditioner by using an AI model, according to an embodiment of the disclosure.

FIGS. 9A and 9B are graphs illustrating a result of predicting the amount of power to be consumed by an air conditioner by using an AI model according to various embodiments of the disclosure.

FIG. 9A is a graph illustrating a result of predicting the amount of power consumed by an air conditioner for each day. FIG. 9B is a graph illustrating a result of accumulating and predicting the amount of power consumed by an air conditioner.

FIGS. 9A and 9B are graphs illustrating a result obtained by comparing the amount of power predicted to be consumed by the air conditioner 30 from August 14 to August 21 with the amount of power actually consumed by the air conditioner 30 from August 14 to August 21, based on weather history information, operation history information of the air conditioner 30, status information of the air conditioner 30, and the amount of power consumed by the air conditioner 30 from August 1 to August 14.

Referring to FIG. 9A, it is found that a graph of the amount of power to be consumed by the air conditioner 30 for each day which is predicted by using an AI model is similar to a graph of the amount of power actually consumed by the air conditioner 30 for each day.

Referring to FIG. 9B, it is found that a graph of the amount of cumulative power to be consumed by the air conditioner 30 which is predicted by using the AI model is similar to a graph of the amount of cumulative power actually consumed by the air conditioner 30.

In detail, there is a difference of about 4.2 kW between the amount of power to be consumed by the air conditioner 30 which is predicted by using the AI model for one week and the amount of power actually consumed by the air conditioner 30. When the difference is converted into a percentage, there is a difference of about 26%. Because such a difference in the amount of power corresponds to the amount of power consumed by the general air conditioner 30 for one hour, it is found that the amount of power consumed is accurately predicted by using the AI model.

Table 1 shows comparison results with other algorithms for predicting the amount of power to be consumed by the air conditioner 30 by using weather forecast information.

TABLE 1

| Measurement | Linear Regression | DNN | Random Forest | Seq2Seq |
|---|---|---|---|---|
| MAE | 6.1 kWatt | 5.4 kWatt | 4.7 kWatt | 4.2 kWatt |
| MAPE | 122% | 104% | 88% | 26% |

Referring to Table 1, there is a difference of about 6.1 kW between the amount of power to be consumed by the air conditioner 30 which is predicted by using a linear regression algorithm for one week and the amount of power actually consumed by the air conditioner 30. When the difference is converted into a percentage, there is a difference of about 122%.

Also, there is a difference of about 5.4 kW between the amount of power to be consumed by the air conditioner 30 for one week which is predicted by using a DNN algorithm and the amount of power actually consumed by the air conditioner 30. When the difference is converted into a percentage, there is a difference of about 104%.

Also, there is a difference of about 4.7 kW between the amount of power to be consumed by the air conditioner 30 which is predicted by using a random forest algorithm for one week and the amount of power actually consumed by the air conditioner 30. When the difference is converted into a percentage, there is a difference of about 88%.

Accordingly, it is found that a method of predicting the amount of power consumed by the air conditioner 30 by using the AI model according to the disclosure is more accurate than methods of predicting the amount of power consumed by the air conditioner 30 by using other algorithms.

Figure 10:
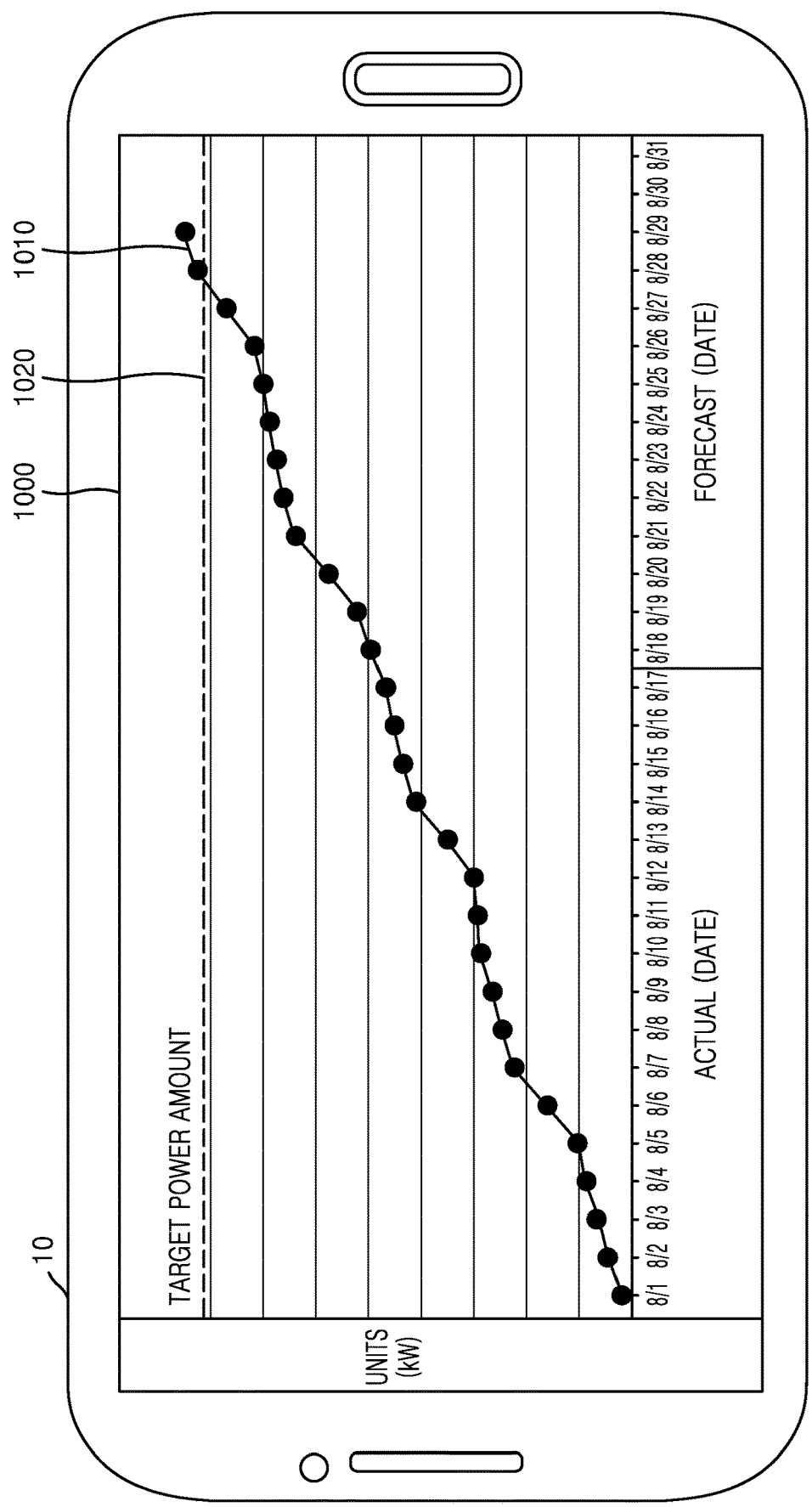
FIG. 10 illustrates that an electronic apparatus displays the amount of power to be consumed by an air conditioner which is predicted by using an AI model, according to an embodiment of the disclosure.

FIG. 10 illustrates that an electronic apparatus displays the amount of power to be consumed by an air conditioner which is predicted by using an AI model according to an embodiment of the disclosure.

Referring to FIG. 10, the electronic apparatus 10 may display information 1000 about a predicted power consumption amount of the air conditioner 30 output from an AI model. For example, the electronic apparatus 10 may display a predicted power amount to be consumed by the air conditioner 30 during a certain period of time after the present time as a graph 1010. Also, the electronic apparatus 10 may output the predicted power amount as a numerical value. The displayed information 1000 may also include a target power amount represented by a threshold value 1020.

According to an embodiment of the disclosure, the electronic apparatus 10 may receive an input that sets a threshold value 1020 from a user. The electronic apparatus 10 may compare the threshold value 1020 with a predicted power consumption amount of the air conditioner 30. The electronic apparatus 10 may output a time at which the predicted power consumption amount is equal to or greater than the threshold value 1020. For example, the electronic apparatus 10 may output a time at which the predicted power consumption amount is equal to or greater than the threshold value 1020 by using means such as certain figures or colors. Also, when the predicted power consumption amount is within a certain range of the threshold value 1020 (e.g., 90% of the threshold value), the electronic apparatus 10 may display a notification.

According to an embodiment of the disclosure, the user may accurately and easily recognize the probability that the predicted power amount of the air conditioner 30 exceeds the set threshold value. Accordingly, the user may be induced to operate the air conditioner 30 in a power saving mode, thereby saving energy.

The electronic apparatus 10 may transmit a control signal so that the air conditioner 30 operates in a power saving mode. For example, the electronic apparatus 10 may transmit a control signal for controlling current of a compressor of the air conditioner 30 (e.g., setting a current value for controlling the number of rotations of the compressor), a control signal for controlling a pressure of the compressor (e.g., controlling a discharge valve through which a refrigerant is discharged from the compressor), a control signal for controlling a refrigerant temperature (e.g., controlling an indoor expansion valve to control a refrigerant temperature), and a control signal for performing/ending a cooling operation of the air conditioner 30.

According to an embodiment of the disclosure, when the predicted power consumption amount is within the certain range of the threshold value, the electronic apparatus 10 may generate a control signal for a power saving operation and may transmit the control signal to the air conditioner 30. Alternatively, the server 20 may generate a control signal for a power saving operation and may transmit the control signal to the electronic apparatus 10 or the air conditioner 30. The electronic apparatus 10 and the server 20 may each include a control model that is an AI model for generating a control signal.

According to an embodiment of the disclosure, the electronic apparatus 10 may transmit, to the air conditioner 30, a control signal for a power saving operation procedure to be performed by the air conditioner 30 which is generated based on an operation pattern of the air conditioner 30 obtained by using the AI model. The control signal may be generated by the AI model and may be transmitted through the electronic apparatus 10 to the air conditioner 30. Alternatively, the electronic apparatus 10 may generate a control signal based on the operation pattern of the air conditioner 30 and may transmit the control signal to the air conditioner 30.

The AI model 300 may obtain a pattern including a series of operation procedures performed by the air conditioner 30 to control an indoor temperature such as current control of the compressor of the air conditioner 30, pressure control of the compressor, refrigerant temperature control, and performing/stopping of a cooling operation from operation history information of the air conditioner 30.

The AI model 300 may obtain preference information of the user such as an operating time of the air conditioner 30 according to indoor and outdoor temperatures, a desired temperature set by the user, information about the strength of wind set by the user, information about a bedtime of the user, a sensitivity of the user, and information about an indoor temperature adaptation time of the user from the operation pattern.

The AI model 300 may identify whether the air conditioner 30 does overcooling from the operation pattern and weather history information. The AI model 300 may generate a control signal for performing a power saving operation where the air conditioner 30 does not overcooling, based on the preference information of the user.

For example, the AI model 300 may generate a control signal for controlling the air conditioner 30 to do powerful cooling only in an initial stage and continuously generate strong wind, based on based on the preference information of the user who likes strong wind. As another example, the AI model 300 may generate a control signal for controlling the air conditioner 30 to do wind-free cooling and remove moisture, based on the preference information of the user who does not like wind. As another example, the AI model 300 may generate a control signal for controlling the air conditioner 30 to do wind-free cooling and increase a desired temperature, based on the information about the bedtime of the user.

Figure 11:
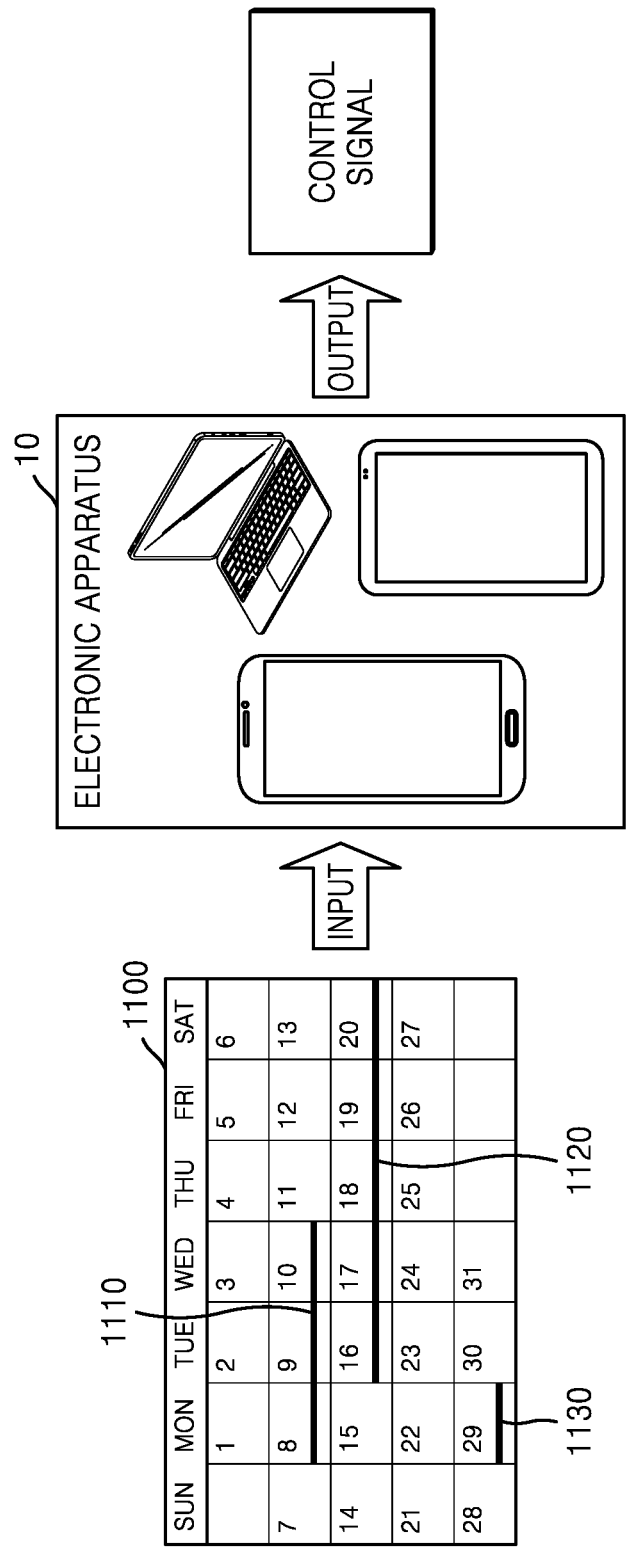
FIG. 11 illustrates that an electronic apparatus generates a control signal based on schedule information of a user, according to an embodiment of the disclosure.
Figure 12:
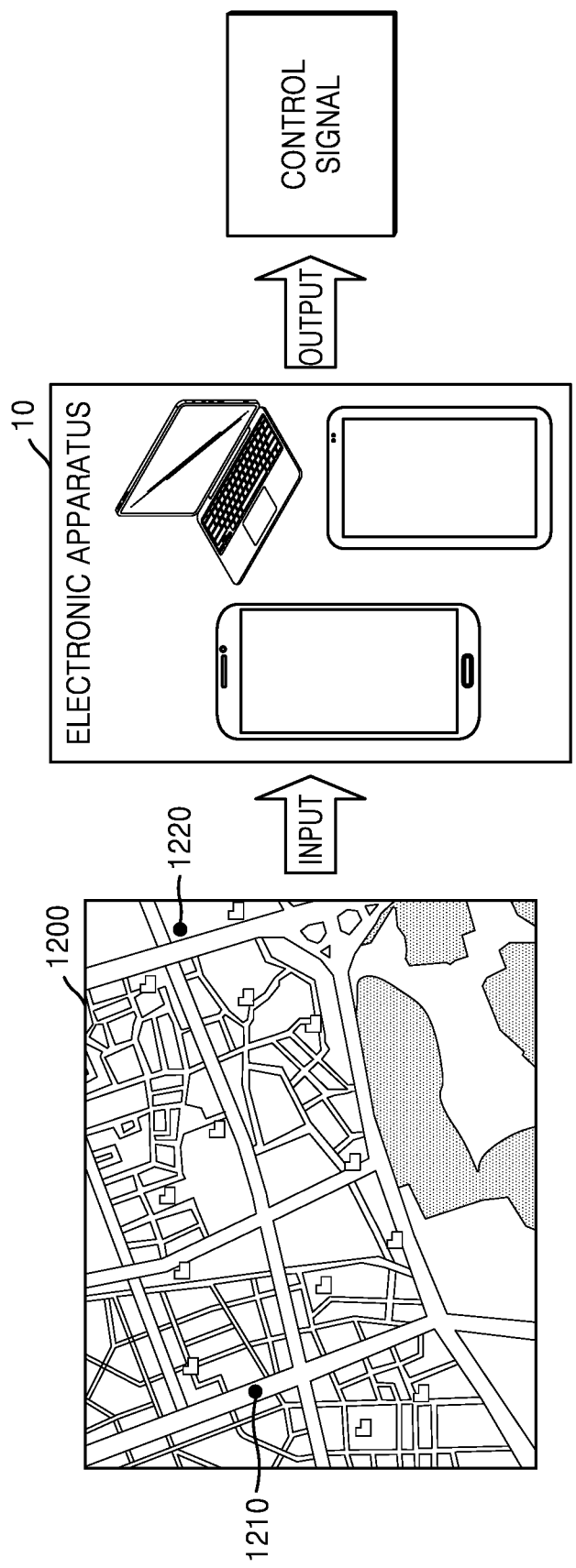
FIG. 12 illustrates that an electronic apparatus generates a control signal based on location information of a user, according to an embodiment of the disclosure.
Figure 13:
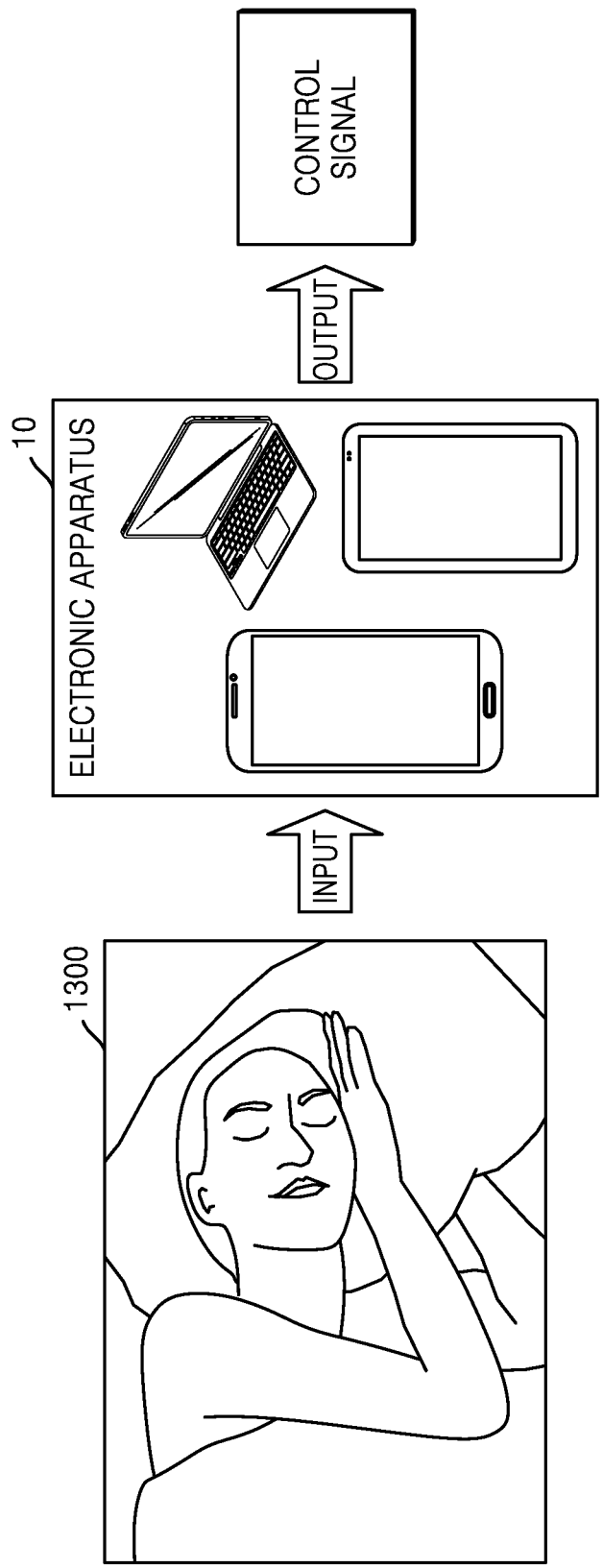
FIG. 13 illustrates that an electronic apparatus generates a control signal based on motion information of a user, according to an embodiment of the disclosure.

FIGS. 11 through 13 illustrate that an electronic apparatus generates a control signal by using personal information of a user according to an embodiment of the disclosure.

When a predicted power consumption amount is within a certain range of a threshold value, the electronic apparatus 10 may generate a control signal for a power saving operation and may transmit the control signal to the air conditioner 30. Alternatively, the server 20 may generate a control signal for a power saving operation and may transmit the control signal to the electronic apparatus 10 or the air conditioner 30. The electronic apparatus 10 and the server 20 may each include a control model that is an AI model for generating and outputting a control signal for a power saving operation procedure to be performed by an air conditioner.

The electronic apparatus 10 may generate a control signal by using personal information of a user and may transmit the control signal to the air conditioner 30. Alternatively, the electronic apparatus 10 may input the personal information of the user to the AI model, and may transmit a control signal output from the AI model to the air conditioner 30.

The personal information of the user refers to information related to the user who uses the air conditioner 30. The personal information of the user may include schedule information of the user, location information of the user, and motion information of the user.

The electronic apparatus 10 may obtain the personal information of the user. For example, the electronic apparatus 10 may obtain the schedule information of the user from a schedule recording application (e.g., a calendar application) or a mail application of the user. As another example, the electronic apparatus 10 may obtain the location information of the user by using a location sensor such as a global positioning system (GPS) sensor. As another example, the electronic apparatus 10 may obtain the motion information of the user by using various devices such as a motion sensor, a gyro sensor, and a camera.

FIG. 11 illustrates that an electronic apparatus generates a control signal based on schedule information of a user according to an embodiment of the disclosure.

Referring to FIG. 11, the electronic apparatus 10 may transmit a control signal for a power saving operation procedure to be performed by the air conditioner 30 to the air conditioner 30 based on schedule information of a user.

According to an embodiment of the disclosure, the electronic apparatus 10 may identify a time for which the user is away from home (e.g., a period for which the user takes a trip) from the schedule information of the user, and may generate a control signal for preventing the air conditioner 30 from operating during the time for which the user is away from home.

For example, the electronic apparatus 10 may obtain the schedule information of the user from a calendar application 1100 of the user. The electronic apparatus 10 may obtain information 1110 about a business trip schedule of the user. The electronic apparatus 10 may obtain information 1120 about a vacation schedule of the user. The electronic apparatus 10 may obtain information 1130 about an after-work meeting schedule.

Also, the electronic apparatus 10 may obtain information about a time for which the user is away from home from the information 1110 about the business trip schedule of the user. The electronic apparatus 10 may obtain information about a time for which the user is away from home from the information 1120 about the vacation schedule of the user. The electronic apparatus 10 may obtain information about a time when the user returns homes from the information 1130 about the after-work meeting schedule.

The electronic apparatus 10 may generate a control signal for preventing the air conditioner 30 from operating during a time for which the user is away from home for business trip, vacation, meeting, etc. and may transmit the control signal to the air conditioner 30.

According to an embodiment of the disclosure, the electronic apparatus 10 may obtain information about the user's return time pattern for each day from the schedule information of the user. For example, the electronic apparatus 10 may obtain information about a time when the user returns home on Monday evening from the schedule information of the user who has a meeting every Monday evening. The electronic apparatus 10 may obtain the information about the user's return time pattern for each day by applying the schedule information of the user to the AI model. The electronic apparatus 10 may generate a control signal for controlling the air conditioner 30 to do precooling before the time when the user returns home, based on the information about the return time pattern. The electronic apparatus 10 may transmit the control signal to the air conditioner 30.

FIG. 12 illustrates that an electronic apparatus generates a control signal based on location information of a user according to an embodiment of the disclosure.

Referring to FIG. 12, the electronic apparatus 10 may transmit a control signal for a power saving operation procedure to be performed by the air conditioner 30 to the air conditioner 30 based on location information of a user, e.g., as shown on a displayed map 1200.

For example, the electronic apparatus 10 may obtain the location information of the user about a current location 1210 of the user. The electronic apparatus 10 may identify a time left before the user returns home based on the location information of the user. The electronic apparatus 10 may generate a control signal for controlling the air conditioner 30 to do precooling before the user's return time. The electronic apparatus 10 may transmit the control signal to the air conditioner 30.

As another example, the electronic apparatus 10 may identify whether the user is away from home 1220 based on the location information of the user. The electronic apparatus 10 may generate a control signal for preventing the air conditioner 30 from operating during a time for which the user is away from home 1220. The electronic apparatus 10 may transmit the control signal to the air conditioner 30.

As another example, the electronic apparatus 10 may obtain information about the user's return time pattern for each day by applying the location information of the user to an AI model. The electronic apparatus 10 may generate a control signal for controlling the air conditioner 30 to do precooling at a certain time before the user's return time based on the information about the return time pattern. The electronic apparatus 10 may transmit the control signal to the air conditioner 30.

FIG. 13 illustrates that an electronic apparatus generates a control signal based on motion information of a user according to an embodiment of the disclosure.

Referring to FIG. 13, the electronic apparatus 10 may transmit a control signal for a power saving operation procedure to be performed by the air conditioner 30 to the air conditioner 30 based on motion information of a user.

For example, the electronic apparatus 10 may obtain the motion information of the user from an image 1300 obtained by using a camera. The electronic apparatus 10 may identify whether the user is sleeping from the image 1300. When the user is sleeping, the electronic apparatus 10 may generate a control signal for controlling the air conditioner 30 to do wind-free cooling and increase a desired temperature. The electronic apparatus 10 may transmit the control signal to the air conditioner 30.

As another example, the electronic apparatus 10 may identify the user's motion of pulling and covering a blanket while sleeping by using the camera. The electronic apparatus 10 may generate a control signal for controlling the air conditioner 30 to do wind-free cooling and increase a desired temperature based on the motion of the user. The electronic apparatus 10 may transmit the control signal to the air conditioner 30.

As another example, the electronic apparatus 10 may obtain the motion information of the user by using a gyro sensor included in the electronic apparatus 10. When the user uses the electronic apparatus 10, the motion information of the user may be obtained by using the gyro sensor. When the motion of the user is not detected during a certain period of time, the electronic apparatus 10 may determine that the user is sleeping, and may generate a control signal for controlling the air conditioner 30 to do wind-free cooling and increase a desired temperature. The electronic apparatus 10 may transmit the control signal to the air conditioner 30.

As another example, the electronic apparatus 10 may obtain the motion information of the user by using an IoT device such as a motion sensor. When the motion of the user is not detected during a certain period of time, the electronic apparatus 10 may determine that the user is sleeping, and may generate a control signal for controlling the air conditioner 30 to do wind-free cooling and increase a desired temperature. The electronic apparatus 10 may transmit the control signal to the air conditioner 30.

The electronic apparatus 10 may generate a control signal in consideration of all of schedule information of the user, location information of the user, and motion information of the user.

Figure 14:
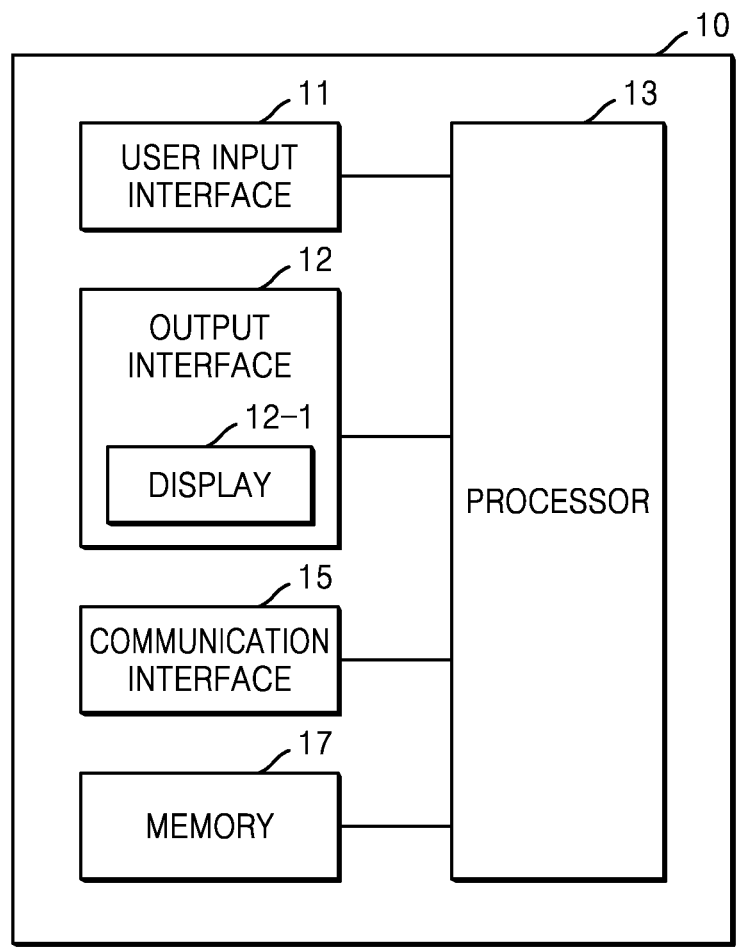
FIG. 14 is a block diagram of an electronic apparatus according to an embodiment of the disclosure.

FIG. 14 is a block diagram of an electronic apparatus according to an embodiment of the disclosure.

Referring to FIG. 14, the electronic apparatus 10 may include a user input interface 11, an output interface 12, the processor 13, a communication interface 15, and a memory 17. However, all elements illustrated in FIG. 14 are not essential elements of the electronic apparatus 10. The electronic apparatus 10 may include elements more or fewer than those illustrated in FIG. 14.

The user input interface 11 refers to a unit through which a user inputs data for controlling the electronic apparatus 10. Examples of the user input interface 11 may include, but are not limited to, a keypad, a dome switch, a touchpad (e.g., a contact-type capacitance method, a pressure-type resistance film method, an infrared sensing method, a surface ultra-sound transmission method, an integral tension measuring method, or a piezoelectric effect method), a touchscreen, a jog wheel, and a jog switch.

The user input interface 11 may receive a user input required for the electronic apparatus 10 to implement the embodiments of the disclosure of FIGS. 1 through 13. For example, the user input interface 11 may receive an input required for the user to set a threshold value. A repeated explanation will not be provided.

The output interface 12 outputs information processed by the electronic apparatus 10. The output interface 12 may include a display 12-1 through which information about the amount of power to be consumed by the air conditioner 30 is output. For example, the display 12-1 may output a predicted power consumption amount of the air conditioner 30 as a graph. Alternatively, the display 12-1 may output the predicted power consumption amount of the air conditioner 30 as a numerical value.

The processor 13 may be at least one processor manufactured for general purposes. Also, the processor 13 may be a processor manufactured for a special purpose of predicting the amount of power to be consumed by the air conditioner 30. Also, the processor 13 may include at least one processor manufactured to perform a function of an AI model.

The processor 13 generally controls an overall operation of the electronic apparatus 10. For example, the processor 13 may generally control the user input interface 11, the output interface 12, the communication interface 15, and the memory 17 by executing at least one instruction stored in the memory 17. The processor 13 may control the communication interface 15 to receive information about the predicted power consumption amount of the air conditioner 30 output from an AI model built in the server 20. The processor 13 may control the display 12-1 to output the information about the predicted power consumption amount of the air conditioner 30 output from the AI model.

The processor 13 may apply operation history information of the air conditioner 30, status information of the air conditioner 30, information about the amount of power consumed by the air conditioner 30 obtained from the air conditioner 30, and weather history information as training data to the AI model. The processor 13 may perform preprocessing on the training data and then may apply a result of the preprocessing to the AI model.

The processor 13 may apply weather forecast information obtained from at least one server (e.g., a server of the Meteorological Administration) that transmits the weather forecast information to the AI model. The processor 13 may perform preprocessing on the weather forecast information and then may apply a result of the preprocessing to the AI model.

The processor 13 may perform a function of the AI model described with reference to FIGS. 1 through 13. The processor 13 may include at least one processor manufactured to perform a function of the AI model. The processor 13 may perform a function of the AI model existing as a software module by executing a series of instructions stored in the memory 17.

The processor 13 may control the communication interface 15 to perform a function of the AI model stored in the server 20. The processor 13 may control the communication interface 15 to transmit data to the server 20 in order to perform a function of the AI model. The processor 13 may control the communication interface 15 to receive data output from the AI model stored in the server 20. The processor 13 may control the communication interface 15 to receive data for refining the AI model from the server 20.

The processor 13 may execute a series of instructions so that the AI model learns new training data.

The communication interface 15 may include at least one element for enabling the electronic apparatus 10 to communicate with other devices (not shown) and the server 20. The other devices (not shown) may be, but are not limited to, computing devices like the electronic apparatus 10.

The memory 17 may store at least one instruction and at least one program for processing and controlling the processor 13, and may store data input to the electronic apparatus 10 or output from the electronic apparatus 10.

The memory 17 may include at least one type of storage medium from among a memory that temporarily stores data such as a random access memory (RAM) or a static random access memory (SRAM), or a memory that non-temporarily stores data such as a flash memory type, a hard disk type, a multimedia card micro type, a card-type memory (e.g., a secure digital (SD) or extreme digital (XD) memory), a read-only memory (ROM), an electrically erasable programmable read-only memory) (EEPROM), a programmable read-only memory (PROM), a magnetic memory, a magnetic disk, or an optical disk.

Figure 15:
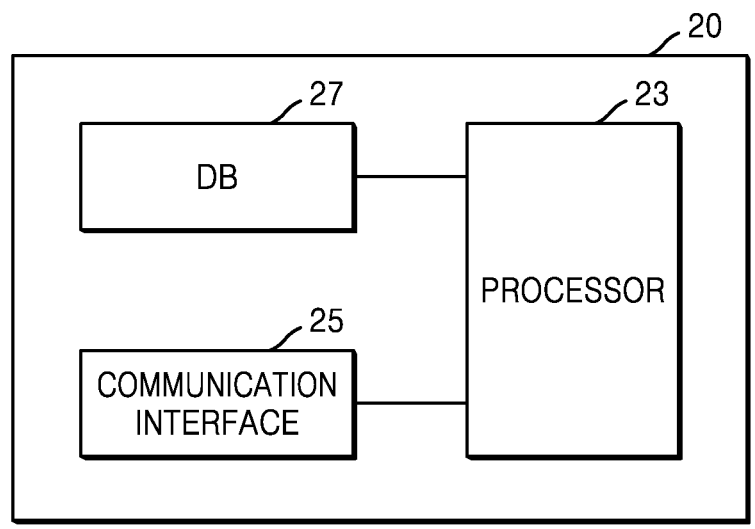
FIG. 15 is a block diagram of a server interoperating with an electronic apparatus, according to an embodiment of the disclosure.

FIG. 15 is a block diagram of a server interoperating with an electronic apparatus according to an embodiment of the disclosure.

Referring to FIG. 15, the server 20 according to an embodiment of the disclosure may include a communication interface 25, a database (DB) 27, and the processor 23.

The communication interface 25 may include at least one element for enabling the server 20 to communicate with the electronic apparatus 10.

The DB 27 may store data and a program for predicting the amount of power to be consumed by the air conditioner 30.

The processor 23 generally controls an overall operation of the server 20. For example, the processor 23 may generally control the DB 27 and the communication interface 25 by executing programs stored in the DB 27 of the server 20. The processor 23 may perform some of operations of the electronic apparatus 10 described with reference to FIGS. 1 through 14 by executing the programs stored in the DB 27.

The electronic apparatus 10 and the server 20 may effectively perform works for learning and data recognition of a data recognition model, and thus may efficiently perform data processing to provide a service suitable for a user's intention.

Figure 16:
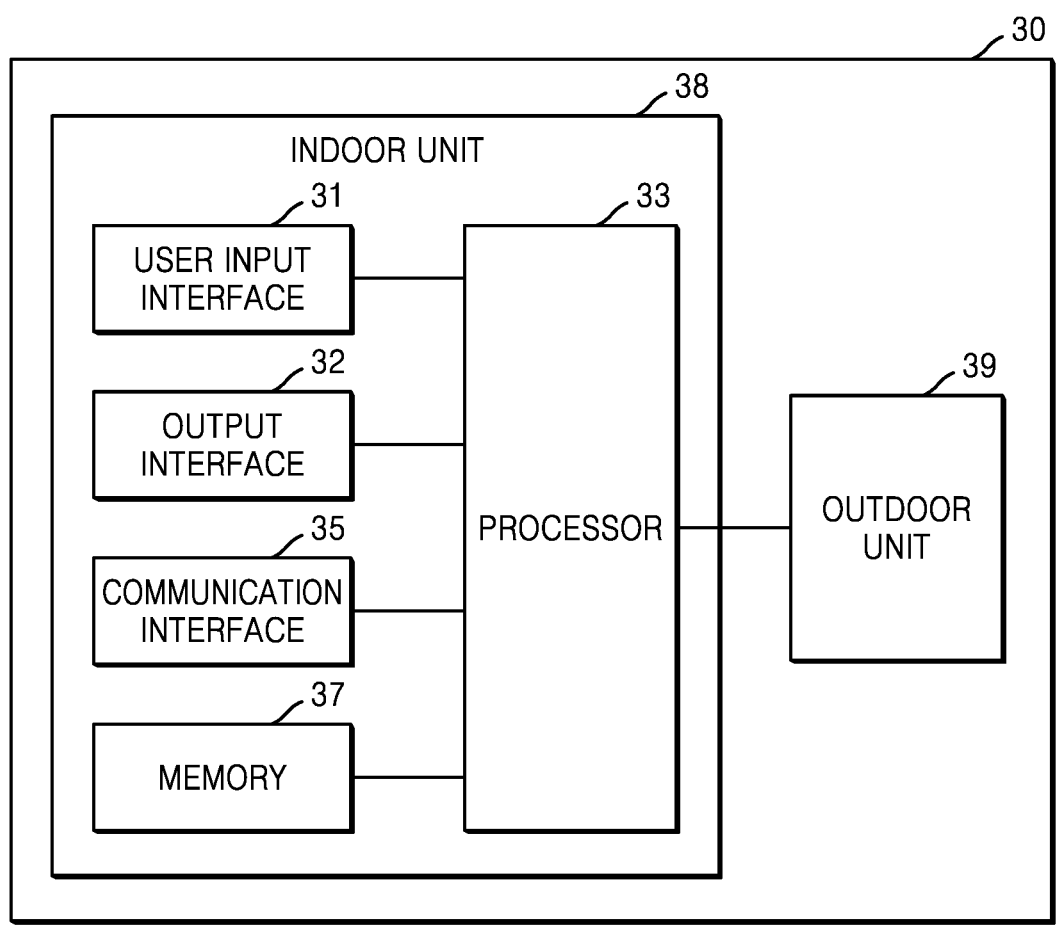
FIG. 16 is a block diagram of an air conditioner according to an embodiment of the disclosure.

FIG. 16 is a block diagram of an air conditioner according to an embodiment of the disclosure.

Referring to FIG. 16, the air conditioner 30 according to some embodiments of the disclosure may include an indoor unit 38 and an outdoor unit 39.

The indoor unit 38 refers to a device located in an indoor space and used to transfer heat between indoor air and a refrigerant. The indoor unit 38 may include an indoor heat exchanger for transferring heat between indoor air and a refrigerant and an indoor expansion valve for reducing a pressure of a refrigerant provided to the indoor heat exchanger during cooling.

The outdoor unit 39 generally refers to a device located in an outdoor space and used to transfer heat between outdoor air and a refrigerant. The outdoor unit 39 may include a compressor for compressing a gas refrigerant, an outdoor heat exchanger for transferring heat between outdoor air and a refrigerant, a four-way valve for selectively guiding a refrigerant discharged from the compressor to one of the outdoor heat exchanger and the indoor unit 38, an outdoor expansion valve for reducing a pressure of a refrigerant guided to the outdoor heat exchanger during heating, and an accumulator for preventing a liquid refrigerant from being introduced into the compressor. The outdoor unit 39 may include an outdoor unit controller (not shown) for controlling operations of the compressor, the outdoor heat exchanger, the four-way valve, the outdoor expansion valve, and the accumulator. The outdoor unit controller may control the outdoor unit 39 based on a control command generated by a processor 33.

The indoor unit 38 may include a user input interface 31, an output interface 32, the processor 33, a communication interface 35 (e.g., a communication circuit or a transceiver), and a memory 37. However, all elements illustrated in FIG. 16 are not essential elements of the air conditioner 30. The air conditioner 30 may include elements more or fewer than those illustrated in FIG. 16.

Also, the air conditioner 30 according to some embodiments of the disclosure may perform at least some of functions of the electronic apparatus 10 described with reference to FIGS. 1 through 14. The air conditioner 30 may include the electronic apparatus 10 as at least one hardware module or software module.

The user input interface 31 refers to a unit through which a user inputs data for controlling the air conditioner 30. For example, the user input interface 31 may receive a motion command of the user for the indoor unit 38.

According to an embodiment of the disclosure, the electronic apparatus 10 may be the user input interface 31. The electronic apparatus 10 may communicate with the air conditioner 30, and may transmit a control command received from the user to the air conditioner 30.

The output interface 32 outputs information processed by the air conditioner 30. For example, the output interface 32 may output information about a current status of the air conditioner 30. Also, the output interface 32 may output information about the amount of power to be consumed by the air conditioner 30.

According to an embodiment of the disclosure, the electronic apparatus 10 may be the output interface 32. The electronic apparatus 10 may communicate with the air conditioner 30, and may output information processed by the air conditioner 30 which is received from the air conditioner 30.

The processor 33 may be at least one processor manufactured for general purposes. Also, the processor 33 may be a processor manufactured for a special purpose of predicting the amount of power to be consumed by the air conditioner 30. Also, the processor 33 may include at least one processor manufactured to perform a function of an AI model.

The processor 33 generally controls an overall operation of the air conditioner 30. For example, the processor 33 may generally control the user input interface 31, the output interface 32, the communication interface 35, and the memory 37 by executing at least one instruction stored in the memory 37. For example, the processor 33 may control the communication interface 35 to receive information about a predicted power consumption amount of the air conditioner 30 output from an AI model built in the server 20. The processor 33 may control the output interface 32 to output the information about the predicted power consumption amount of the air conditioner 30 output from the AI model.

The processor 33 may perform at least some of functions of the electronic apparatus 10 included as at least one software module. Also, the processor 33 may control at least one hardware module to perform at least some of functions of the electronic apparatus 10 described with reference to FIGS. 1 through 14. The communication interface 35 may include at least one element for enabling the air conditioner 30 to communicate with the electronic apparatus 10, the server 20, and other devices (not shown). For example, the communication interface 35 may receive a control signal from at least one of the electronic apparatus 10 or the server 20. Also, the communication interface 35 may receive the information about the predicted power consumption amount of the air conditioner 30 from at least one of the electronic apparatus 10 or the server 20. Also, the communication interface 35 may transmit information processed by the air conditioner 30 to at least one of the electronic apparatus 10 or the server 20.

The memory 37 may store at least one instruction and program for processing and controlling the processor 33, and may store data input to the air conditioner 30 or output from the air conditioner 30.

Some embodiments of the disclosure may be implemented as a recording medium including computer-executable instructions such as a computer-executable program module. A computer-readable medium may be an arbitrary available medium accessible by a computer, and examples thereof include all volatile and non-volatile media and separable and non-separable media. Further, examples of the computer-readable medium may include a computer storage medium. Examples of the computer storage medium include all volatile and non-volatile media and separable and non-separable media, which have been implemented by an arbitrary method or technology, for storing information such as computer-readable instructions, data structures, program modules, or other data.

Also, the term "unit" used herein may be a hardware component such as a processor or a circuit and/or a software component executed in a hardware component such as a processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of an air conditioner, the operation method comprising:
    obtaining, by the air conditioner, feature information on usage patterns of the air conditioner according to weather conditions;
    transmitting, by the air conditioner, the feature information on the usage patterns of the air conditioner according to the weather conditions to a server as training data for an artificial intelligence model;
    obtaining, by the air conditioner, weather forecast information;
    transmitting, by the air conditioner, the weather forecast information to the server;
    receiving, by the air conditioner, a predicted power consumption amount to be consumed by the air conditioner from the server, wherein the predicted power consumption amount is outputted from the artificial intelligence model when the weather forecast information is inputted to the artificial intelligence model;
    displaying, by the air conditioner, the predicted power consumption amount of the first air conditioner output from the artificial intelligence model;
    displaying, by the air conditioner, a notification indicating that the predicted power consumption amount of the air conditioner is within a predetermined range of a threshold value when the predicted power consumption amount of the air conditioner is within the predetermined range of the threshold value; and
    performing, by the air conditioner, a power saving operation when the predicted power consumption amount of the air conditioner is within the predetermined range of the threshold value,
    wherein the artificial intelligence model is trained, by the server, such that, when a weather condition of the weather conditions is inputted to the artificial intelligence model, the artificial intelligence model outputs an amount of power consumed by the air conditioner obtained from a feature information corresponding the weather condition by using the feature information on the usage patterns of the air conditioner according to the weather conditions as the training data.

2. The operation method of claim 1, wherein the artificial intelligence model is trained to obtain correlation information, by learning weather history information, an amount of power consumed by each of a plurality of air conditioners, operation history information of each of the plurality of air conditioners, status information of each of the plurality of air conditioners, and type information of each of the plurality of air conditioners.

3. The operation method of claim 2, wherein the artificial intelligence model is trained to:
    obtain operation patterns of the plurality of air conditioners according to the weather condition, by learning weather history information of a first duration and operation history information of each of the plurality of air conditioners of the first duration, and
    obtain first correlation information based on the obtained operation patterns.

4. The operation method of claim 3, wherein the artificial intelligence model is trained to:
    obtain second correlation information, based on a weather history of a second duration after the first duration, operations of the plurality of air conditioners related to the weather history of the second duration, and the first correlation information, and predict the amount of power to be consumed by the air conditioner, based on the second correlation information.

5. The operation method of claim 2, wherein the artificial intelligence model is trained to:
    predict and output a first power amount to be consumed by the air conditioner during a third duration, based on weather forecast information of the third duration and the correlation information,
    predict a second power amount to be consumed by the air conditioner during a fourth duration, based on weather forecast information of the fourth duration after the third duration, the predicted first power amount, and the correlation information, and
    output the second power amount.

6. The operation method of claim 1, further comprising:
    comparing, by the air conditioner, a threshold value input from a user with the predicted power consumption amount, and outputting a time at which the predicted power consumption amount is equal to or greater than the threshold value.

7. The operation method of claim 1, further comprising:
    obtaining, by the air conditioner, personal information of a user;
    inputting, by the air conditioner, the personal information of the user to the artificial intelligence model; and
    transmitting, by the air conditioner, a first control signal for a power saving operation procedure to be performed by the air conditioner, the first control signal being output from the artificial intelligence model to the air conditioner, wherein the artificial intelligence model is trained to generate the first control signal based on the personal information.

8. The operation method of claim 2, wherein the artificial intelligence model is trained to:

obtain feature information about an operation pattern of each of the plurality of air conditioners from operation history information of each of the plurality of air conditioners, generate a first class comprising the air conditioner, by clustering the air conditioner and the plurality of air conditioners having operation patterns similar to an operation pattern of the air conditioner based on the obtained feature information, obtain first correlation information between the weather condition and power consumption amounts of the air conditioners included in the first class, based on the weather history and pieces of feature information of the air conditioners included in the first class, and predict the amount of power to be consumed by the air conditioner based on the first correlation information and the weather forecast information.

9. A computer program product comprising a non-transitory computer-readable storage medium having recorded thereon a plurality of instructions, which, when executed, instruct at least one processor to:

obtain, by an air conditioner, feature information on usage patterns of the air conditioner according to weather conditions, transmit, by the air conditioner, the feature information on the usage patterns of the air conditioner according to the weather conditions to a server as training data for an artificial intelligence model, obtain, by the air conditioner, weather forecast information, transmit, by the air conditioner, the weather forecast information to the server, receive, by the air conditioner, a predicted power consumption amount to be consumed by the air conditioner from the server, wherein the predicted power consumption amount is outputted from the artificial intelligence model when the weather forecast information is inputted to the artificial intelligence model, display, by the air conditioner, the predicted power consumption amount of the air conditioner, output from the artificial intelligence model, display, by the air conditioner, a notification indicating that the predicted power consumption amount of the air conditioner is within a predetermined range of a threshold value when the predicted power consumption amount of the air conditioner is within the predetermined range of the threshold value, and perform, by the air conditioner, a power saving operation when the predicted power consumption amount of the air conditioner is within the predetermined range of the threshold value, wherein the artificial intelligence model is trained, by the server, such that, when a weather condition of the weather conditions is inputted to the artificial intelligence model, the artificial intelligence model outputs an amount power consumed by the air conditioner obtained from a feature information corresponding the weather condition by using the feature information on the usage patterns of the air conditioner according to the weather conditions as the training data.

10. An air conditioner comprising:

a memory configured to store at least one instruction;

a communication circuit;

a display; and at least one processor coupled to the memory, wherein the at least one instruction, which when executed, configures the at least one processor to:

obtain feature information on usage patterns of the air conditioner according to weather conditions;

control the communication circuit to transmit the feature information on the usage patterns of the air conditioner according to the weather conditions to a server as training data for at least one artificial intelligence model;

obtain weather forecast information;

control the communication circuit to transmit the weather forecast information to the server;

control the communication circuit to receive a predicted power consumption amount to be consumed by the air conditioner from the server, wherein the predicted power consumption amount is outputted from the at least one artificial intelligence model when the weather forecast information is inputted to the at least one artificial intelligence model;

control the display to display the predicted power consumption amount of the air conditioner output from the at least one artificial intelligence model, and control the display to display a notification indicating that the predicted power consumption amount of the air conditioner is within a predetermined range of a threshold value when the predicted power consumption amount of the air conditioner is within the predetermined range of the threshold value; and perform a power saving operation when the predicted power consumption amount of the air conditioner is within the predetermined range of the threshold value, wherein the at least one artificial intelligence model is trained, by the server, such that, when a weather condition of the weather conditions is inputted to the at least one artificial intelligence model, the at least one artificial intelligence model outputs an amount power consumed by the air conditioner obtained from a feature information corresponding the weather condition by using the feature information on the usage patterns of the air conditioner according to the weather conditions as the training data.

11. The air conditioner of claim 10, wherein the at least one artificial intelligence model is further trained to obtain correlation information, by learning weather history information, an amount of power consumed by each of a plurality of air conditioners, operation history information of each of the plurality of air conditioners, status information of each of the plurality of air conditioners, and type information of each of the plurality of air conditioners.

12. The air conditioner of claim 11, wherein the at least one artificial intelligence model comprises a pattern analysis model trained to:

obtain operation patterns of the plurality of air conditioners according to the weather condition, by learning weather history information of a first duration and operation history information of each of the plurality of air conditioners of the first duration, and obtain first correlation information based on the obtained operation patterns.

13. The air conditioner of claim 12,
wherein the pattern analysis model is trained to obtain second correlation information, based on a weather history of a second duration after the first duration, operations of the plurality of air conditioners related to the weather history of the second duration, and the first correlation information, and
wherein the at least one artificial intelligence model further comprises a predicting model trained to predict the amount of power to be consumed by the air conditioner, based on the second correlation information.

14. The air conditioner of claim 11, wherein the at least one artificial intelligence model comprises a predicting model trained to:
predict and output a first power amount to be consumed by the air conditioner during a third duration based on weather forecast information of the third duration and the correlation information, and
predict and output a second power amount to be consumed by the air conditioner during a fourth duration based on weather forecast information of the fourth duration after the third duration, the predicted first power amount, and the correlation information.

15. The air conditioner of claim 10, wherein, the at least one instruction, which when executed, further configures the at least one processor to compare a threshold value input from a user with the predicted power consumption amount and output a time at which the predicted power consumption amount is equal to or greater than the threshold value.

16. The air conditioner of claim 10, further comprising:
a communication circuit configured to transmit/receive data to/from the first air conditioner,
wherein the at least one instruction, which when executed, further configures the at least one processor to:
obtain personal information of a user;
input the personal information of the user to the at least one artificial intelligence model; and
control the communication circuit to transmit, to the air conditioner, a first control signal for a power saving operation procedure to be performed by the air conditioner, the first control signal being output from the at least one artificial intelligence model, and
wherein the at least one artificial intelligence model further comprises a control model trained to generate the first control signal based on the personal information.

17. The air conditioner of claim 11, wherein the at least one artificial intelligence model comprises:
a pattern analysis model trained to:
obtain feature information about an operation pattern of each of a plurality of air conditioners from operation history information of each of the plurality of air conditioners,
generate a first class comprising the air conditioner by clustering air conditioners having operation patterns similar to an operation pattern of the air conditioner based on the obtained feature information, and
obtain first correlation information between the weather condition and power consumption amounts of the air conditioners included in the first class based on the weather history and pieces of feature information of the air conditioners included in the first class; and
a predicting model trained to predict the amount of power to be consumed by the air conditioner based on the first correlation information and the weather forecast information.

18. The air conditioner of claim 10, further comprising:
a communication circuit configured to transmit/receive data to/from a server,
wherein the at least one instruction, which when executed, further configures the at least one processor to:
obtain operation history information of the air conditioner and input the operation history information to a first artificial intelligence model; and
control the communication circuit to transmit first feature information about an operation pattern of the air conditioner output from the first artificial intelligence model to the server and receive, from the server, information about the predicted power consumption amount of the air conditioner obtained by the server by using a second artificial intelligence model,
wherein the first artificial intelligence model is trained to obtain and output the first feature information based on the operation history information of the air conditioner, and
wherein the second artificial intelligence model is trained to obtain and output the information about the predicted power consumption amount of the air conditioner based on the first feature information and the weather forecast information.

* * * * *